Oct. 24, 1967 J. HANDLEY 3,349,381

MECHANICAL MULTI-STAGE AGGREGATOR USED WITH A DISC FILE

Filed Sept. 6, 1962 24 Sheets-Sheet 1

INVENTOR
JOHN HANDLEY
BY
Francis J. Thomas
ATTORNEY

Oct. 24, 1967 J. HANDLEY 3,349,381

MECHANICAL MULTI-STAGE AGGREGATOR USED WITH A DISC FILE

Filed Sept. 6, 1962 24 Sheets-Sheet 3

Oct. 24, 1967 J. HANDLEY 3,349,381

MECHANICAL MULTI-STAGE AGGREGATOR USED WITH A DISC FILE

Filed Sept. 6, 1962 24 Sheets-Sheet 7

Oct. 24, 1967 J. HANDLEY 3,349,381

MECHANICAL MULTI-STAGE AGGREGATOR USED WITH A DISC FILE

Filed Sept. 6, 1962 24 Sheets-Sheet 8

MECHANICAL MULTI-STAGE AGGREGATOR USED WITH A DISC FILE

Filed Sept. 6, 1962

Oct. 24, 1967 J. HANDLEY 3,349,381

MECHANICAL MULTI-STAGE AGGREGATOR USED WITH A DISC FILE

Filed Sept. 6, 1962 24 Sheets-Sheet 12

Oct. 24, 1967 J. HANDLEY 3,349,381

MECHANICAL MULTI-STAGE AGGREGATOR USED WITH A DISC FILE

Filed Sept. 6, 1962 24 Sheets-Sheet 15

Oct. 24, 1967 J. HANDLEY 3,349,381

MECHANICAL MULTI-STAGE AGGREGATOR USED WITH A DISC FILE

Filed Sept. 6, 1962 24 Sheets-Sheet 24

3,349,381

MECHANICAL MULTI-STAGE AGGREGATOR USED WITH A DISC FILE

John Handley, 39 Wilhelmina Ave., Coulsdon, Surrey, England

Filed Sept. 6, 1962, Ser. No. 221,920
Claims priority, application Great Britain, Sept. 6, 1961, 31,938/61; Sept. 26, 1961, 34,411/61; Nov. 7, 1961, 39,744/61; Dec. 5, 1961, 43,399/61; Feb. 16, 1962, 6,040/62; May 23, 1962, 19,921/62
17 Claims. (Cl. 340—174.1)

This invention relates to setting equipment for use in magnetic disc information files, machine tools, and any other equipment required to be set to any one of a large number of closely-spaced settings, and to mechanical devices such as aggregate motion devices and mechanical servo-amplifiers, suitable for use in such equipments.

The object of the invention is to provide fast and reliable setting equipments and mechanisms suitable for use therein.

One aspect of the invention consists in the application of mechanical aggregate motion devices to magnetic disc files.

Other aspects of the invention relate to the design of mechanical aggregate motion devices.

Further aspects relate to mechanical servo-amplifiers and their association with aggregate motion devices.

Yet another aspect of the invention relates to adjustment means for correcting the setting of a mechanism to obtain close tolerances.

The invention will be described with reference to certain embodiments shown in the accompanying drawings in which:

FIGS. 1 and 2 are front and side elevations of a disc file.

FIGS. 3*a*, 3*b* and 3*c* are sectional side elevations of the lower selector portions of the disc file.

Figure 8A:
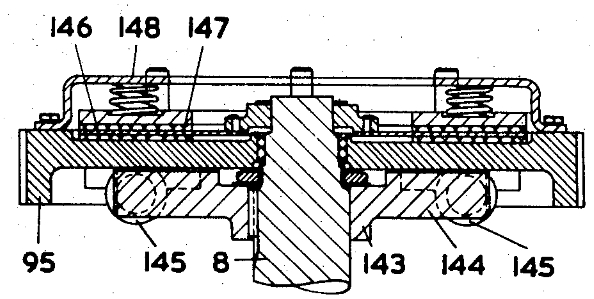
FIG. 8 shows cam shaft damping means.
Figure 8:
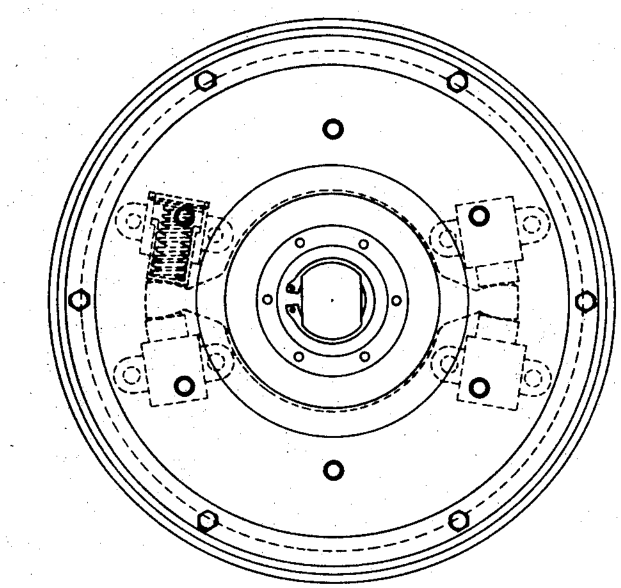

FIG. 8*a* is a sectional view of FIG. 8.

Figure 9:
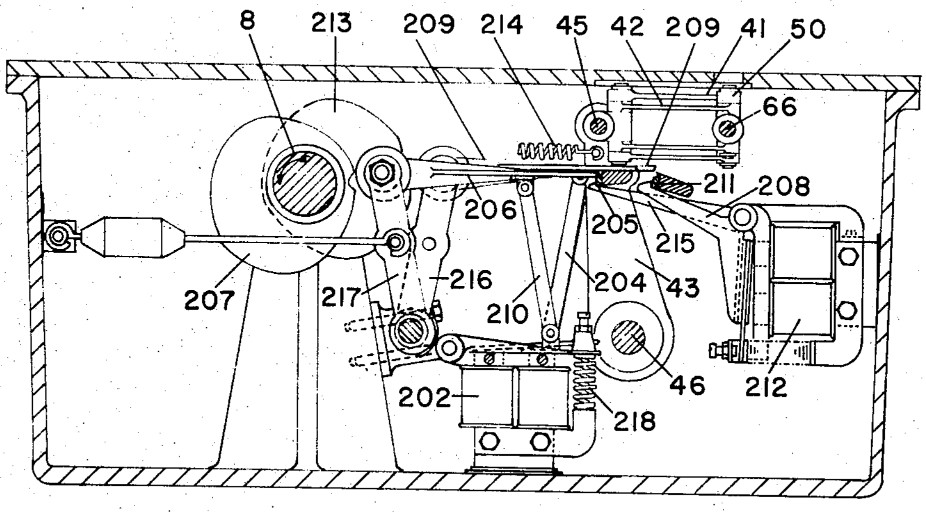

FIG. 9 is a cross-sectional elevation of a push rod form of linkage operating equipment.

Figure 10:
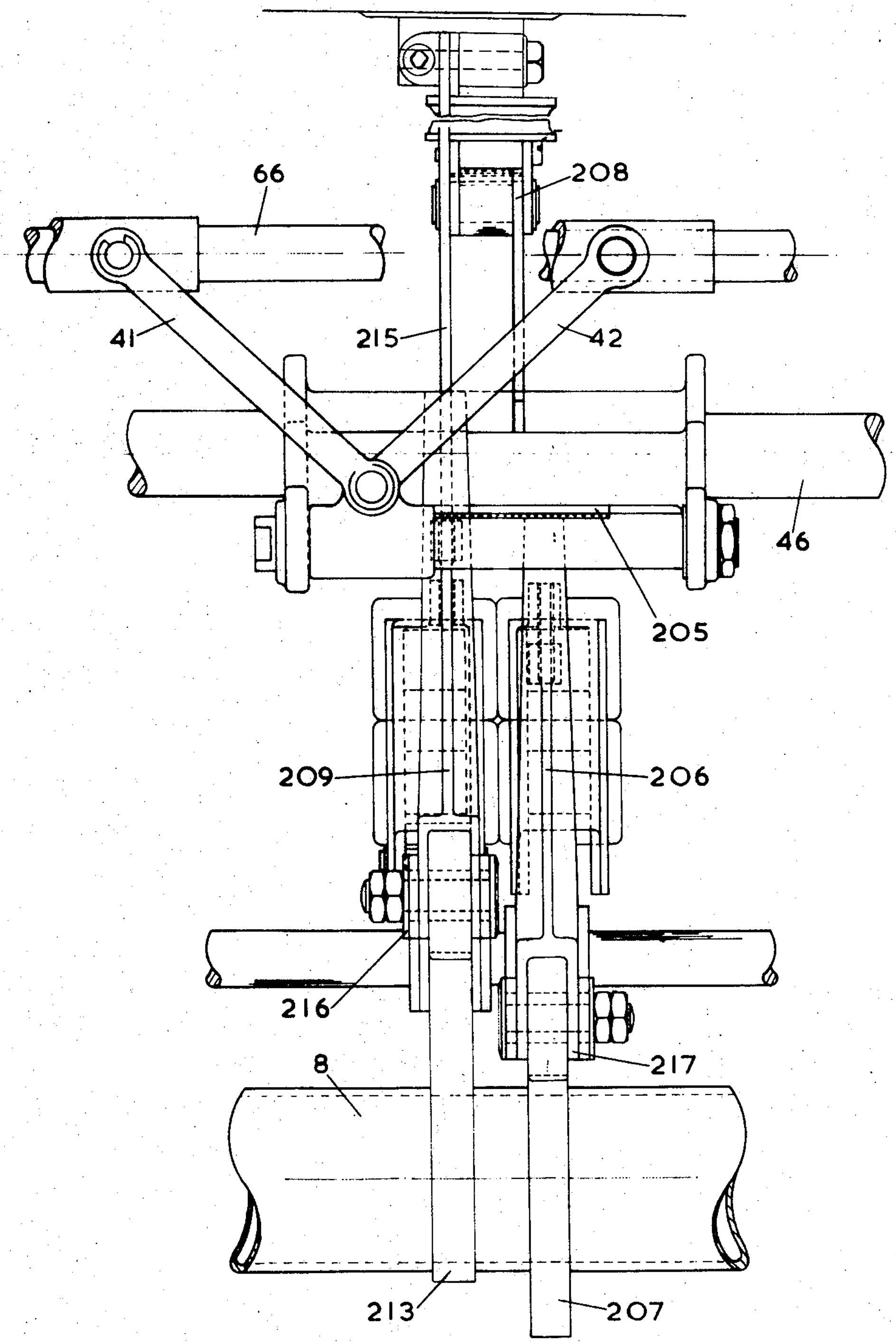

FIG. 10 is a plan view of FIG. 9.

Figure 11:
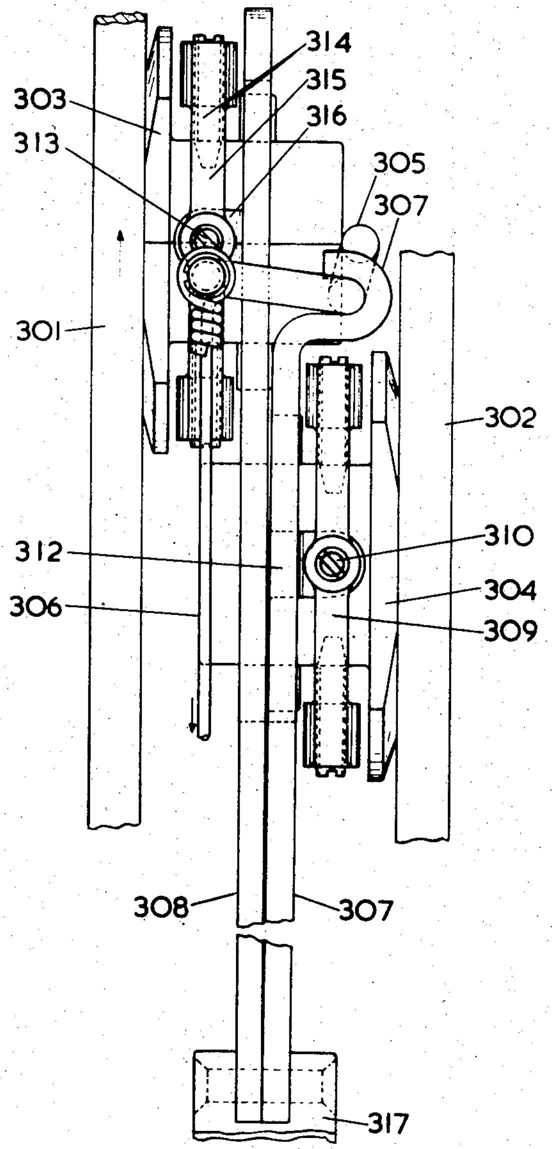
Figures 12, 12A:
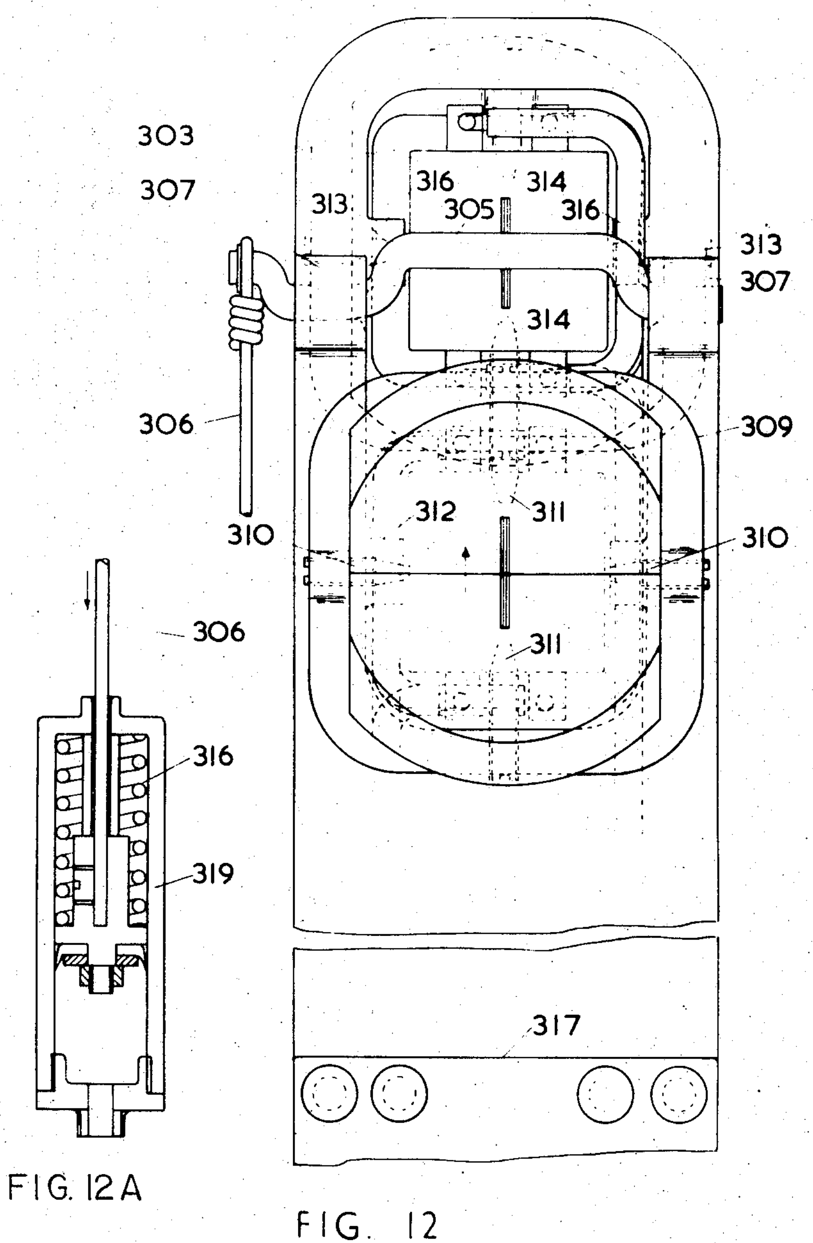

FIGS. 11 and 12 show adjustable read heads in plan and side views.

FIG. 12*a* shows the details of the pressure control valve of FIG. 12.

Figure 13:
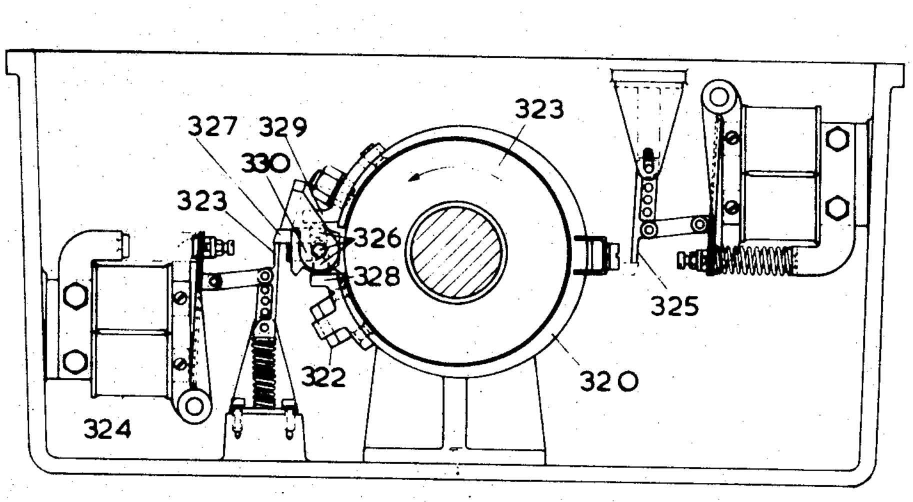

FIG. 13 shows the cam shaft clutch.

Figures 14, 14A:
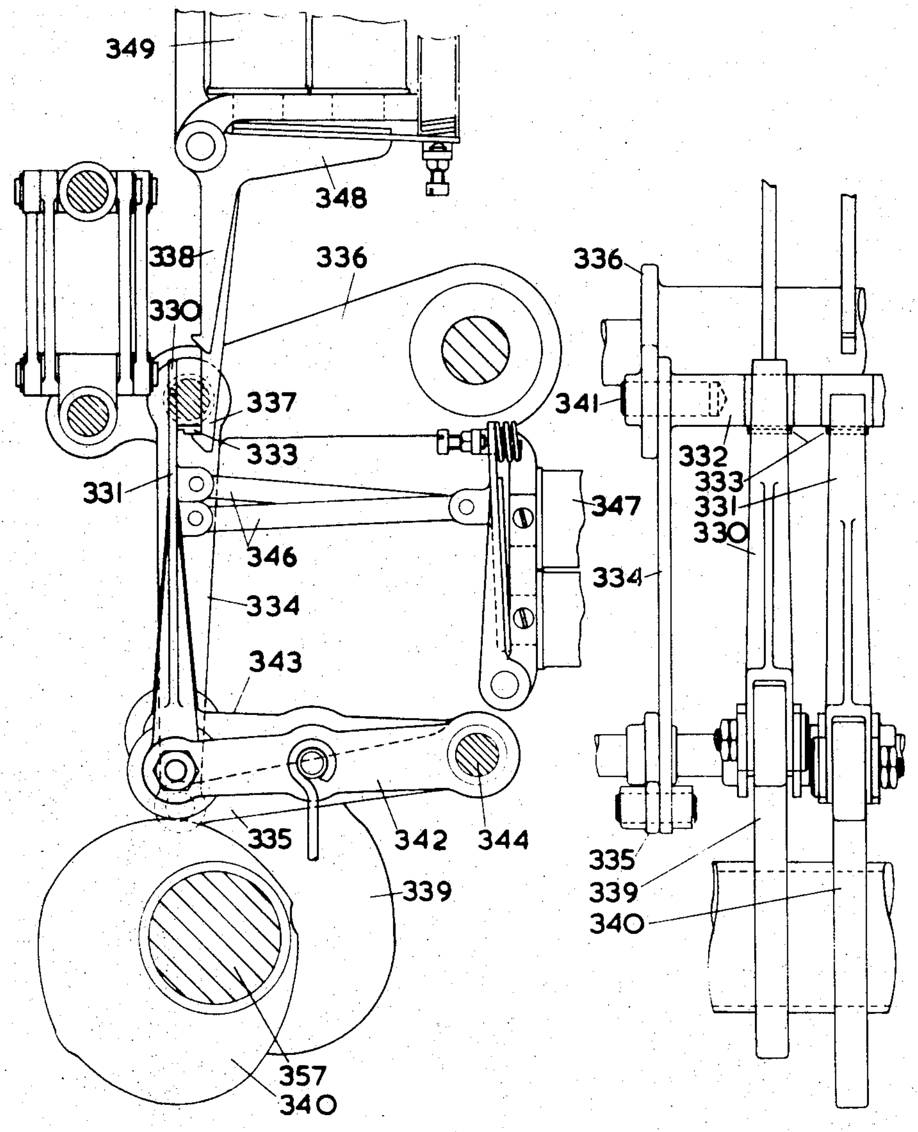
Figure 15:
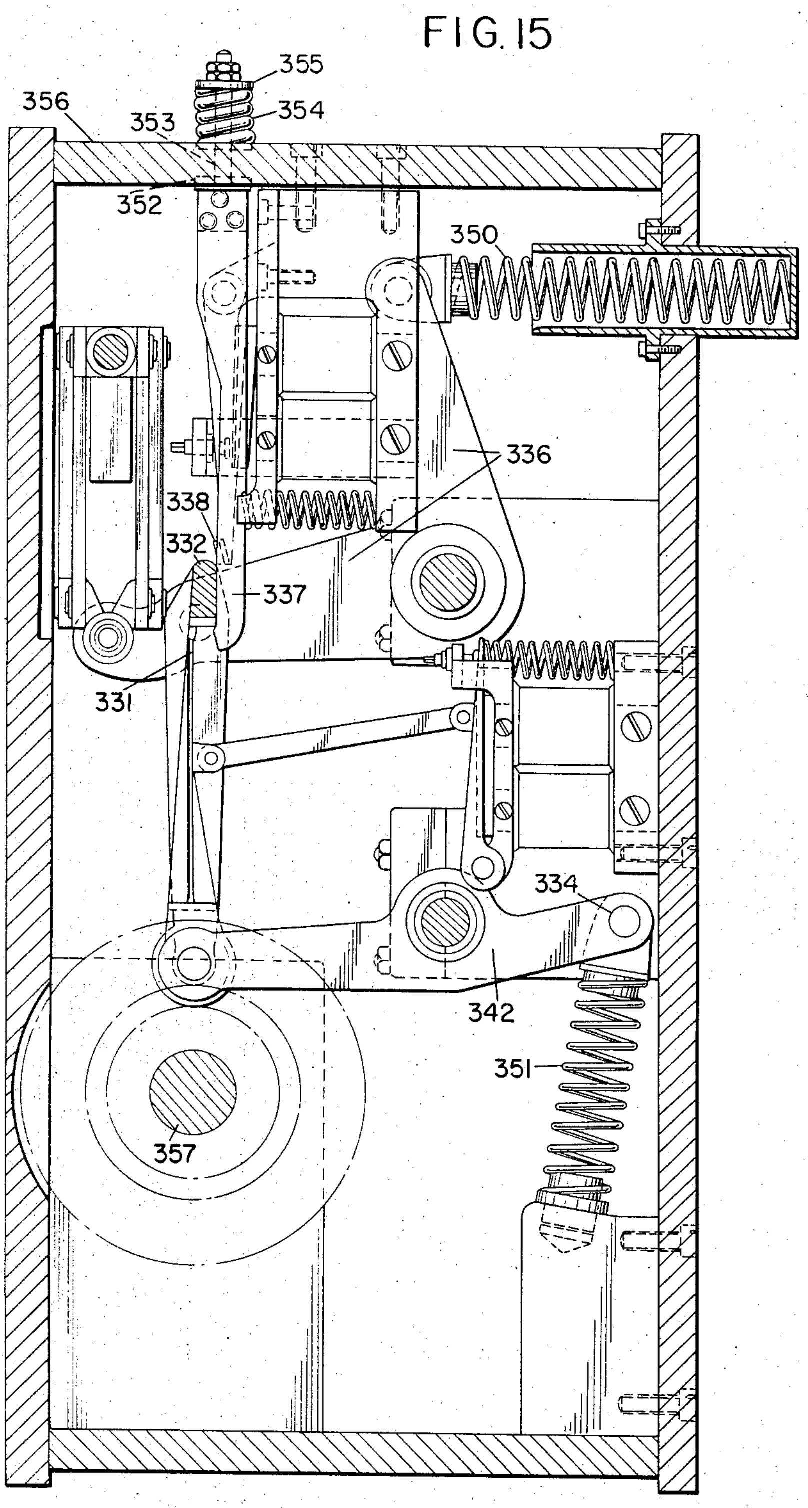

FIGS. 14, 15 show modified push rod linkages.

FIG. 14*a* is a front view of FIG. 14.

Figure 16:
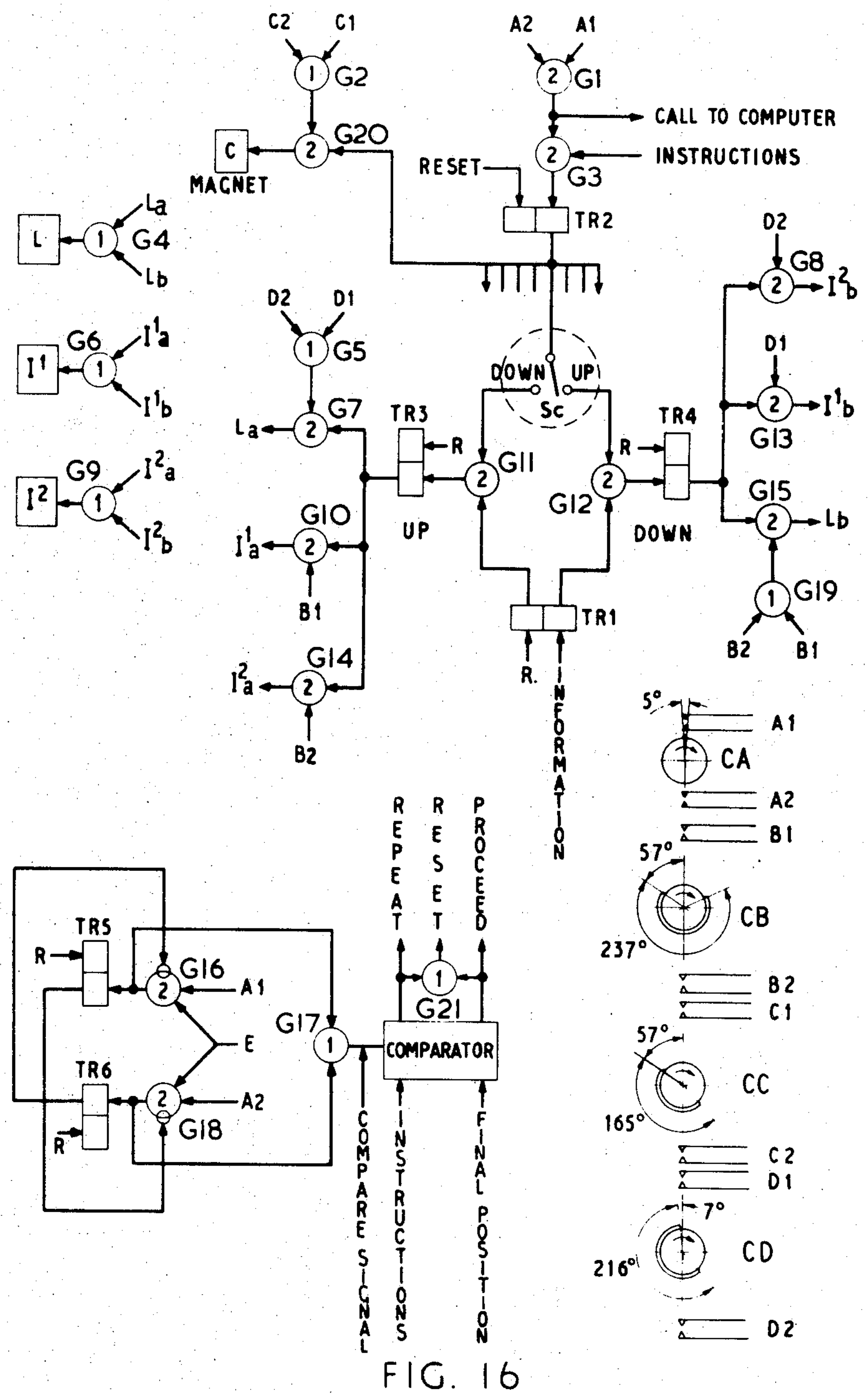

FIG. 16 is the control circuit for FIG. 14.

Figure 4:
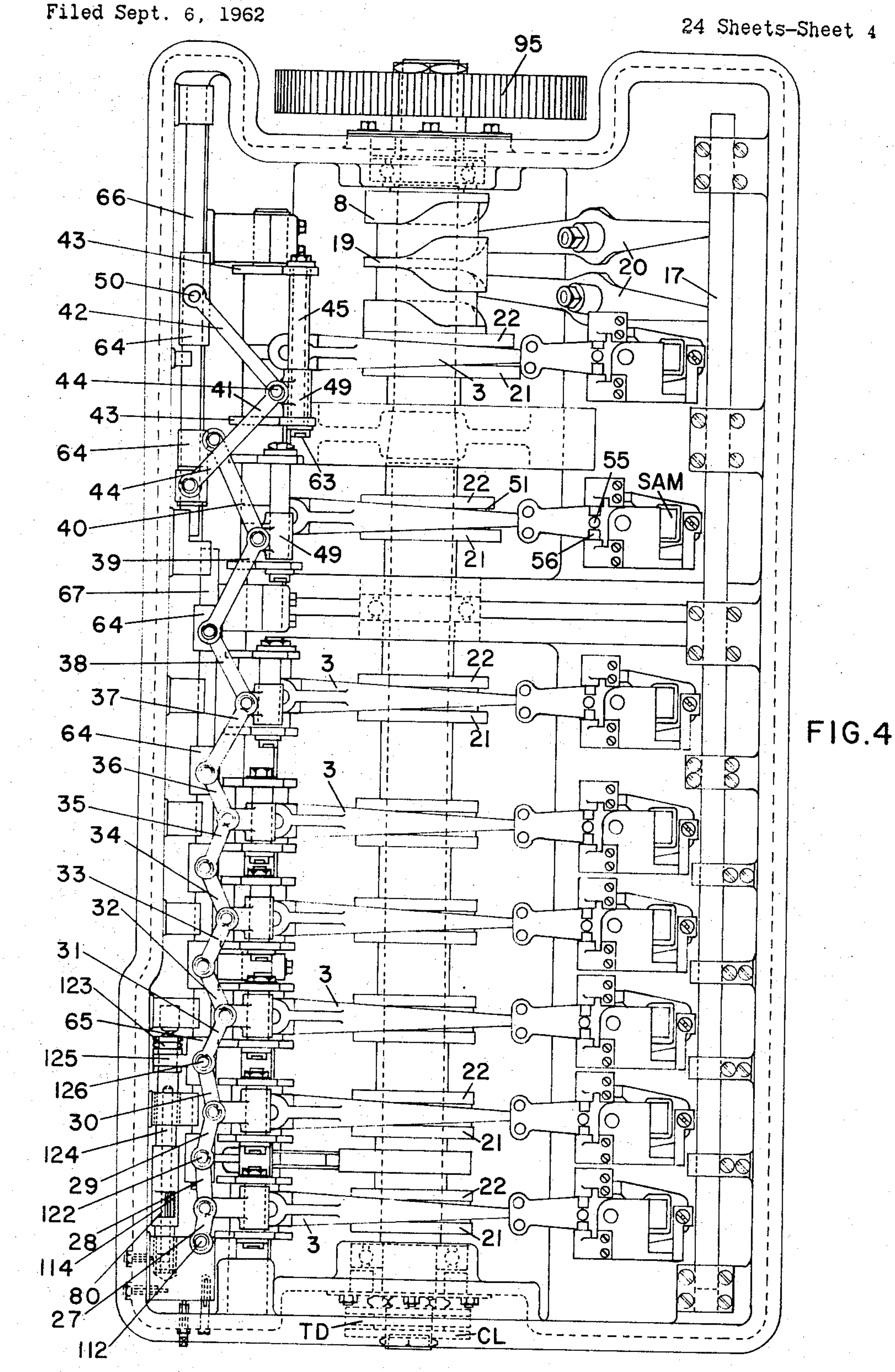
FIG. 4 is a plan view of the selector equipment.
Figure 17:
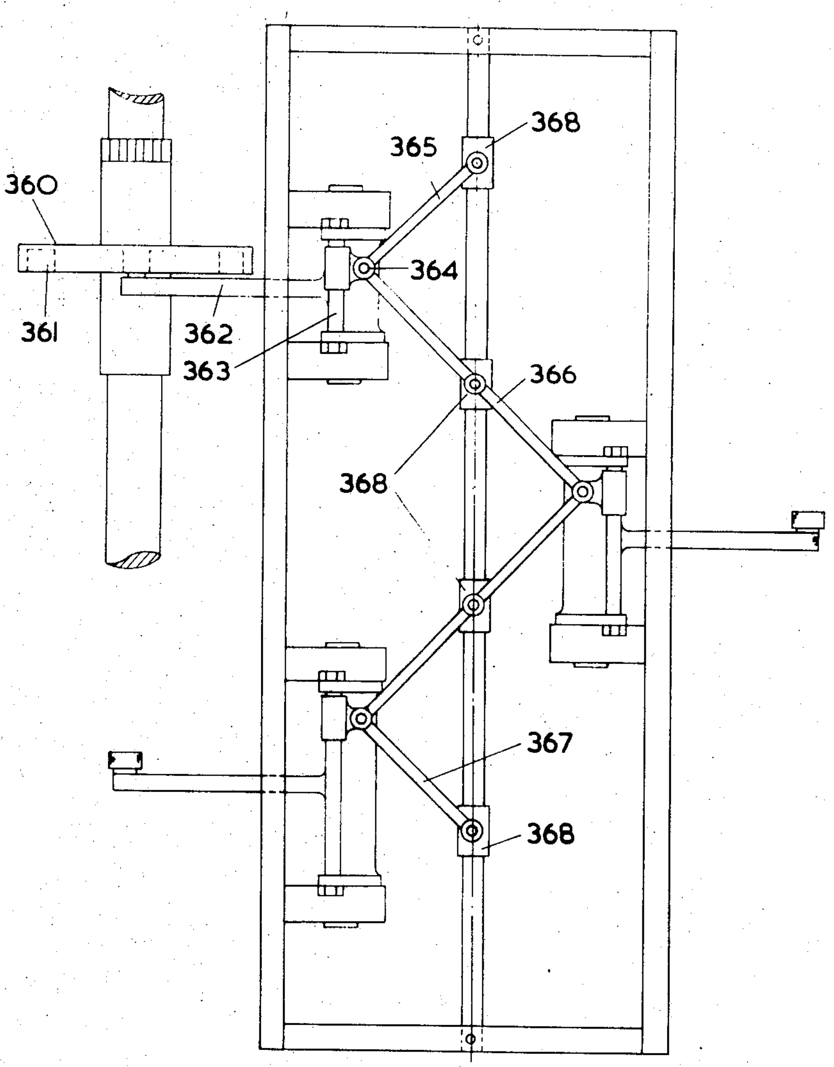

FIG. 17 shows yet another form of cam operation for the aggregator of FIG. 4.

Figure 18:
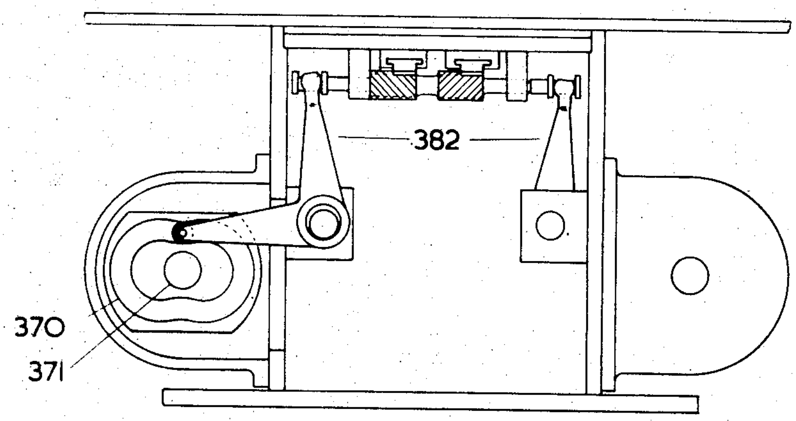
Figure 19:
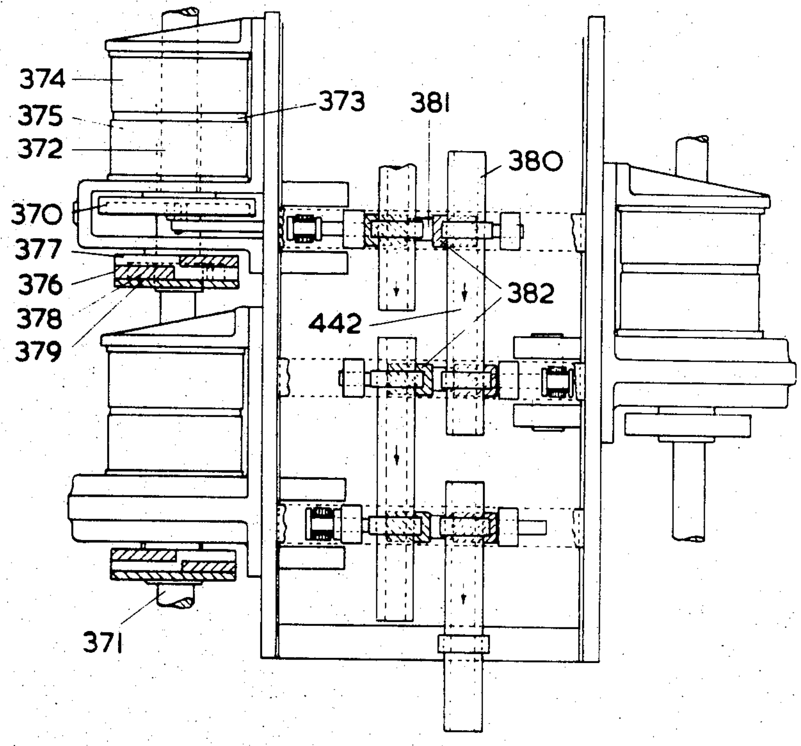

FIGS. 18, 19 show in elevation and plan, a rack and gear aggregate motion device.

Figure 20:
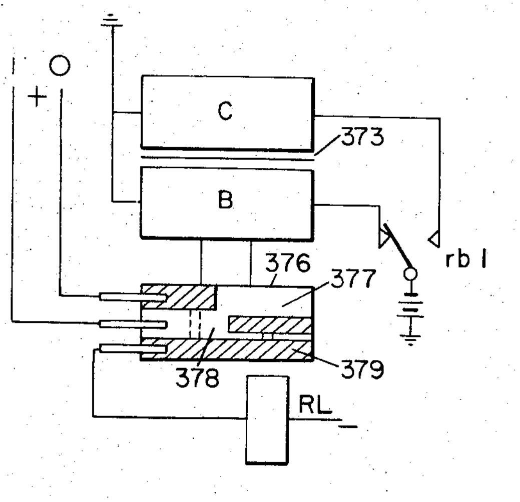

FIG. 20 shows the control circuit for FIGS. 18 and 19.

Figure 21:
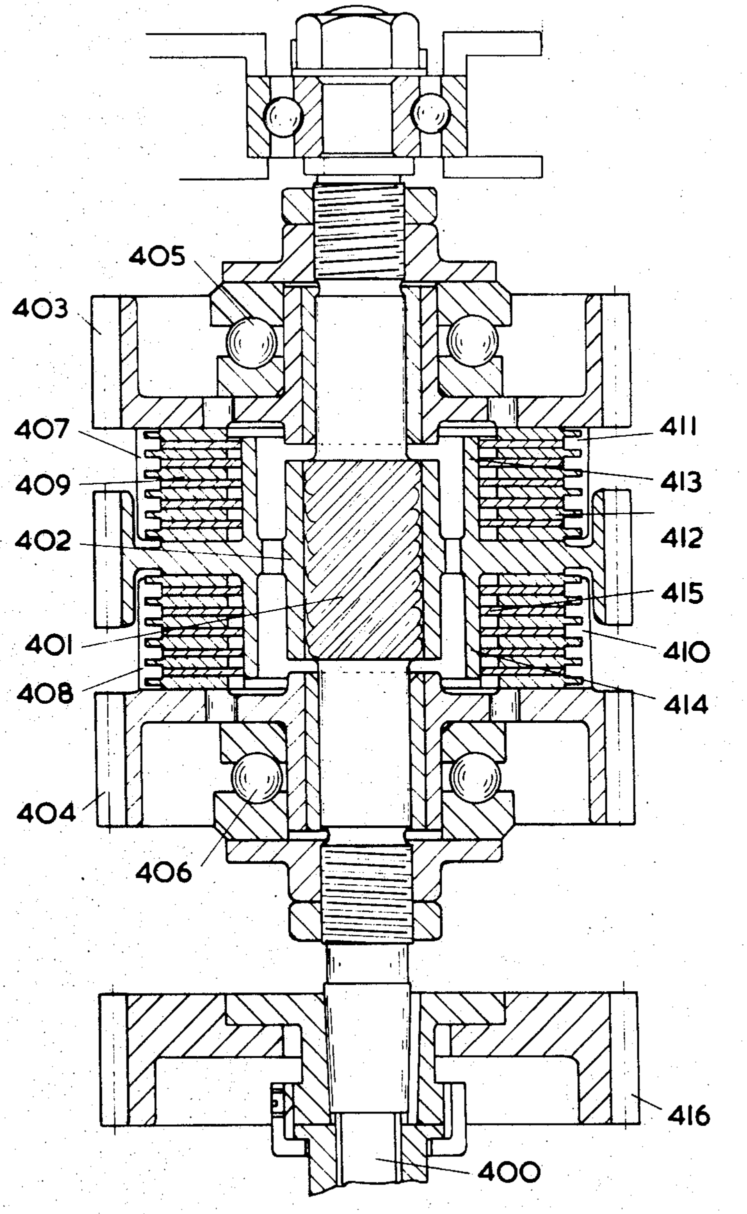

FIG. 21 is a cross-section of a mechanical servo-amplifier.

Figure 22:
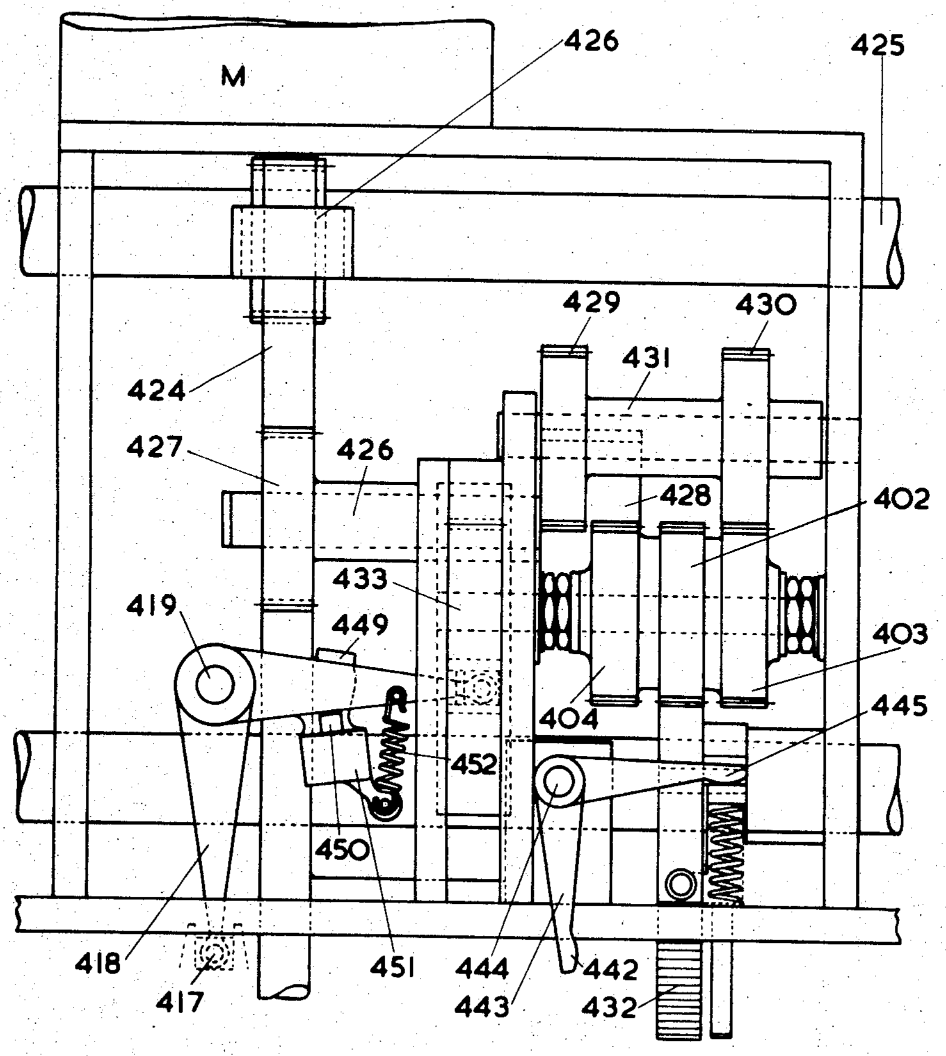
Figure 23:
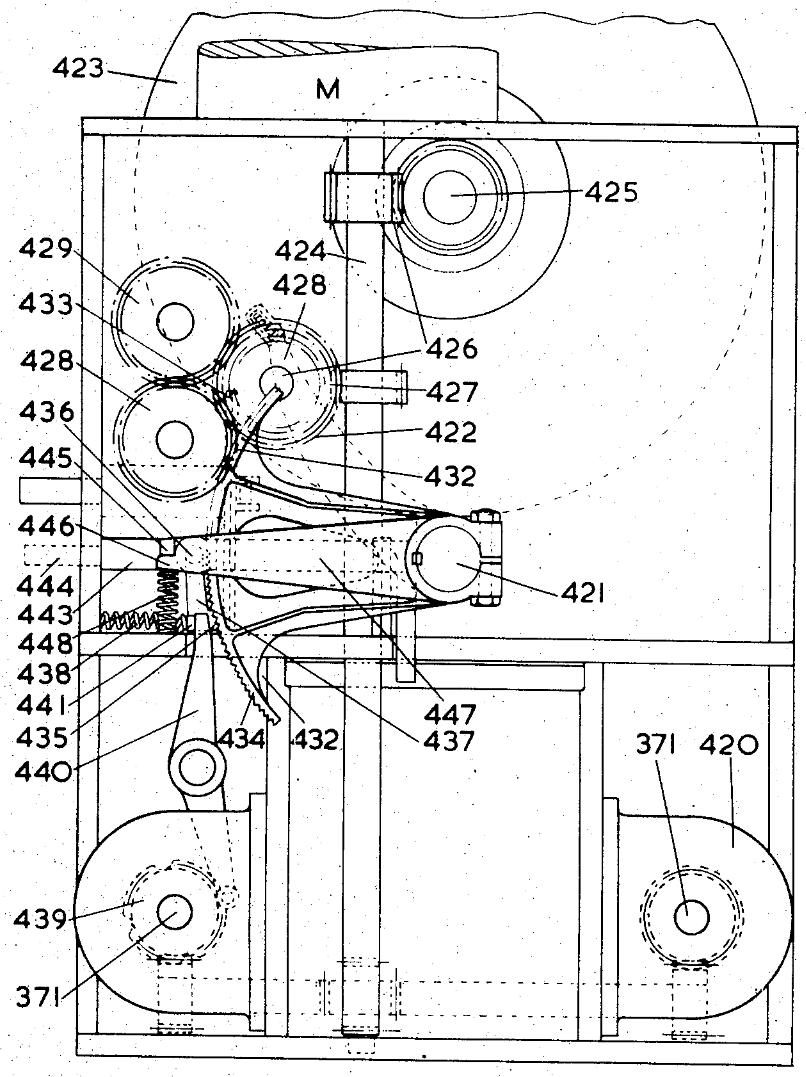
Figure 24:
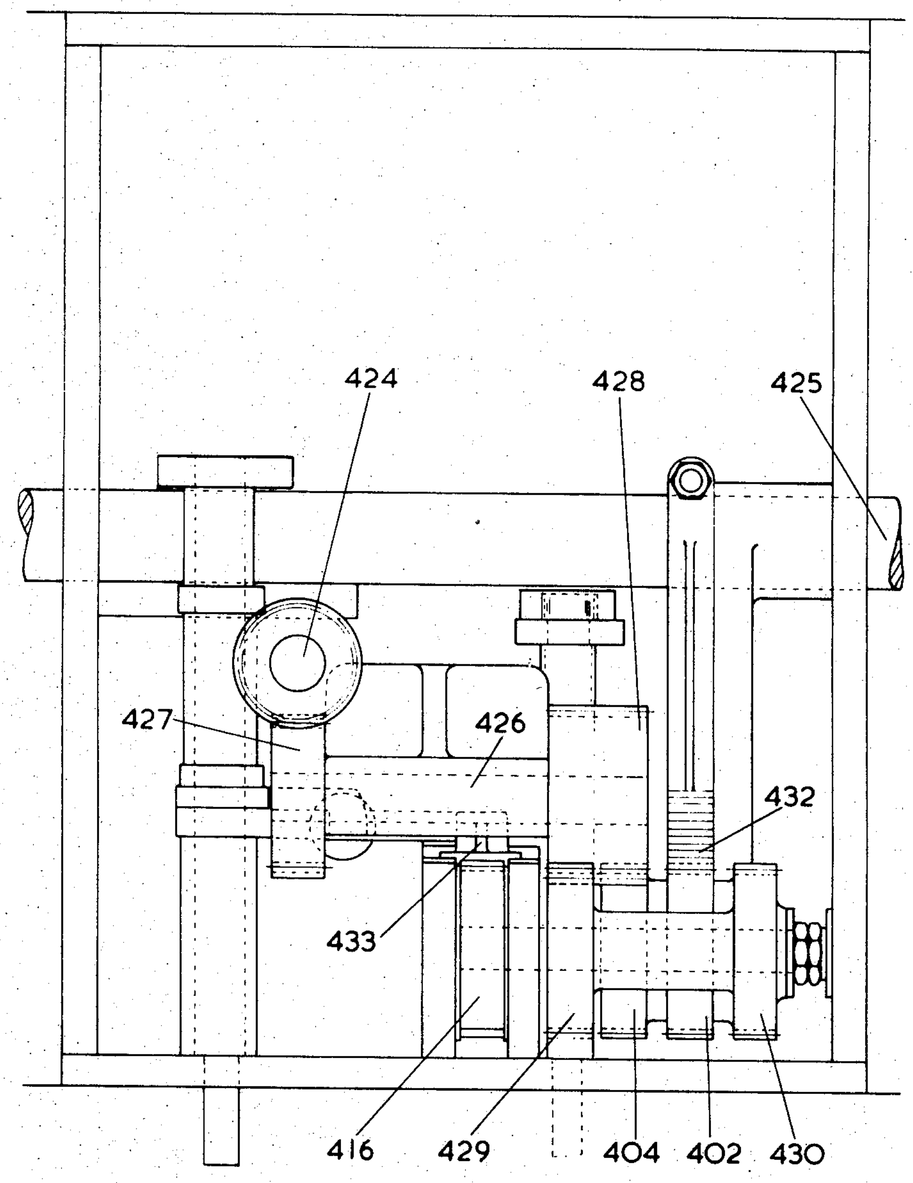
Figure 25:
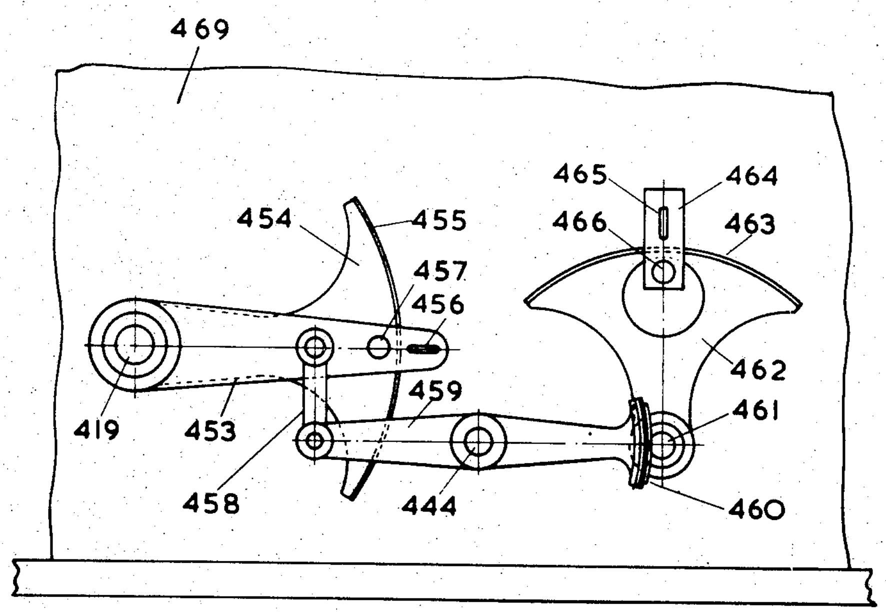
Figure 26:
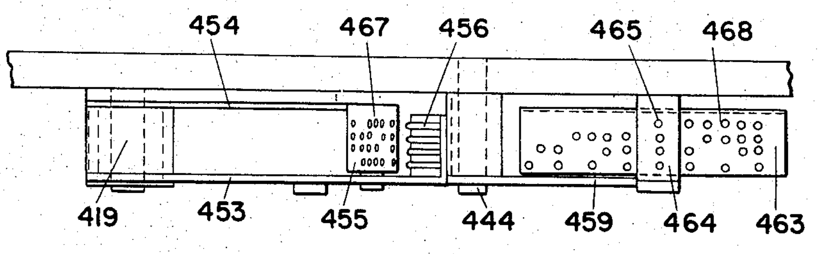

FIGS. 22, 23, 24 show reading arm setting equipment incorporating a servo-amplifier, in front and side elevation and in plan, while FIGS. 25, 26 show in plan and in side elevation read arm position indicating equipment.

In control systems responsive to electrical codes, the decimal system has given way to the binary system. The same technique can be applied to mechanical summation and the equipment to be described utilises this technique.

The machine stores information on a number of discs 98 coated with ferrous oxide, the information being written and read by magnetic heads 99 which are attached to arms 90 on a vertical shaft 97 which can be turned to any one of 256 radial positions corresponding to 256 equally spaced circular tracks when signalled to so do from a computer.

The computer signals the required radial position (or track) on the discs 98 through presenting an address which is in eight-element binary code.

Figure 1:
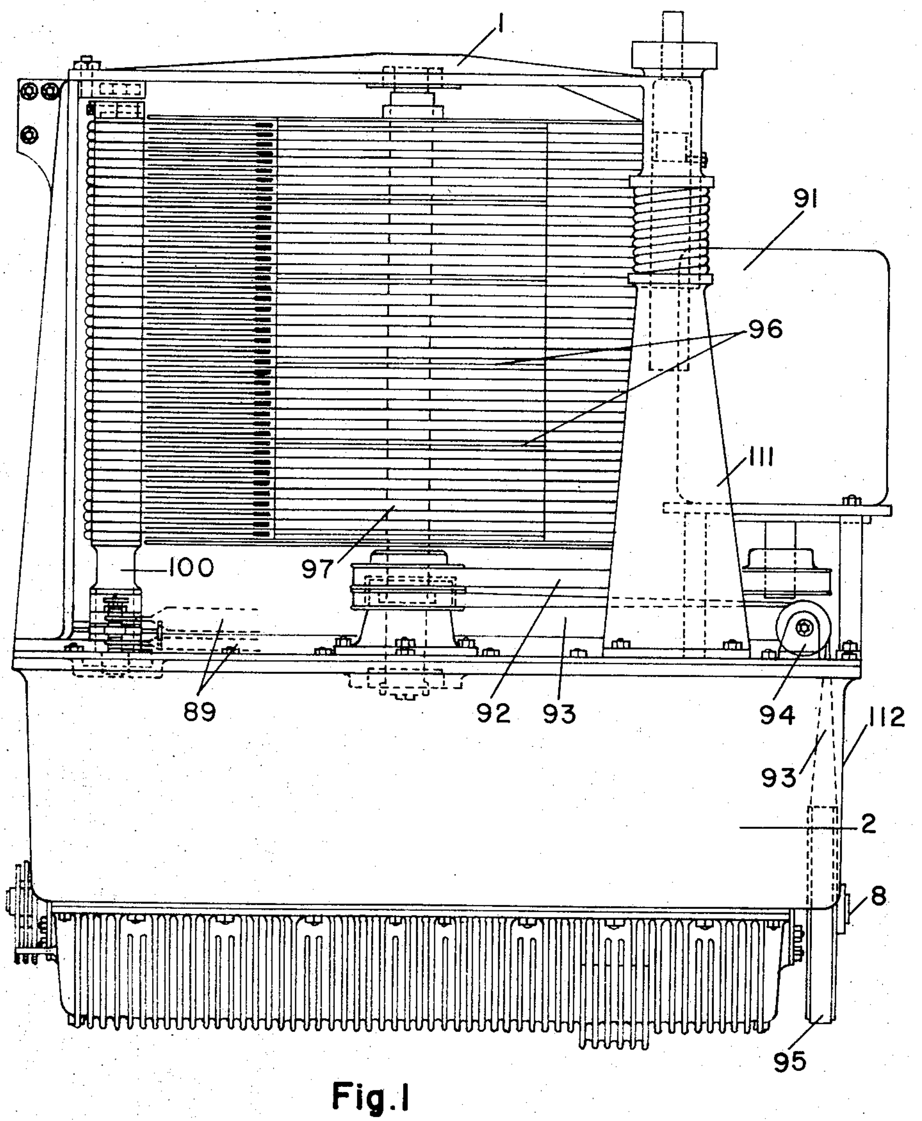

The general layout of the disc file 1, FIG. 1, is as follows.

The file discs 98 consisting of flexible plastic or steel coated with ferrous oxide nickel, or the like, are mounted in groups of eight, 96, FIG. 1, on hollow hubs, which are keyed on to vertical shaft 97 journalled in bearings in a framework 101.

Both sides of the file discs 98 are used for magnetic storage and pairs of magnetic heads 99 are mounted on arms 90 fixed to a shaft for rotation so as to enter between the discs 98. Each disc provides, for example, 256 tracks, which are equally spaced radially of the disc.

The disc file 1 is rotated by toothed belt 92 between toothed pulleys on the disc shaft 97 and on the vertical shaft of an electric motor 91. The disc file frame 1 and the motor 91 are mounted on the framework 102 of the track selector mechanism 2. The selector mechanism is cam-controlled, and the horizontal cam shaft 8 is driven via a pair of horizontally spaced pulleys 94, FIG. 1, by a toothed belt 93 from the disc file shaft 97, so that the cam shaft 8 rotates at half the speed of the disc file 1. The rotation of the reading head arms 90 is obtained from the selector mechanism at 50, FIG. 3 and a flexible steel tape 76 through an inclined link 77, FIG. 3, passing between the selector mechanism and shown end-on in a sector 87 on the reading arm shaft 100.

The purpose of the equipment is to position the heads of a magnetic disc-file, or any other device, in any one of a number of aligned positions, in response to multi-bit coded instructions. The mechanism employed is arranged to be directly responsive to the individual bits of the multi-bit code and to aggregate a set of movements individually determined by the individual bits of the codes.

There is nothing fundamentally new in this: the difficulty which is overcome with the present equipment is to obtain a smooth and accurate aggregate motion mechanism. The equipment utilises a linear series of interlinked triangular linkages 27, 28, . . . 41, 42 on a common base line, 66, 67, FIG. 4; operated by moving the apices, e.g. 44, of the triangles individually to and from the common base line so as to lengthen and shorten the individual base lines of the triangular linkages, and through the interlinkage of the individual triangular linkages to lengthen and shorten the common base-line between 102 and 50, FIG. 4. Thus, if one end 102 of the common base line is fixed, the other end 50 is moved in accordance with the aggregate effect of the individual movements applied to the apices e.g. 44 of the individual triangular linkages.

In order to move such a mechanism direct from one code setting to another, without returning to an intermediate home position, it is necessary to create a means for moving each linkage apex e.g. 44 backwards, or forwards, or not at all, according to the relation between the corresponding bits of successive multibit codes.

If one considers an X–bit binary code, in which each bit can be 0 or 1, then the corresponding bits of successive pairs of codes can be 0, 0; 0, 1; 1, 1; 1, 0. In the case of 0, 0 and 1, 1, the existing setting of the corresponding triangular linkage must be maintained; it is pointed out that the existing settings in the two cases are different, and the maintenance of both the settings must be catered for.

In the case of 0, 1 and 1, 0, the existing setting of the corresponding triangular linkage must be changed: the changes in the two cases are in the opposite directions. A code responsive mechanism is provided which caters for all four requirements, and which comprises individual cam-operated lever mechanisms 3, 7, 62, 6, 10, FIG. 3 controlled by individual cam assemblies 21, 51, 22 each of which comprises separate camming and guiding surfaces for positively controlling the relations between the cam-follower shoe 5, FIG. 3 and the cam assembly 21, 51, 22 for dealing with the four different code responses required. The individual cams of an assembly 21, 51, 11 are side-by-side along the cam shaft, so that the cam-follower shoe 5 has to be moved axially of the shaft in different ways according to the operational requirements.

Figure 3A:
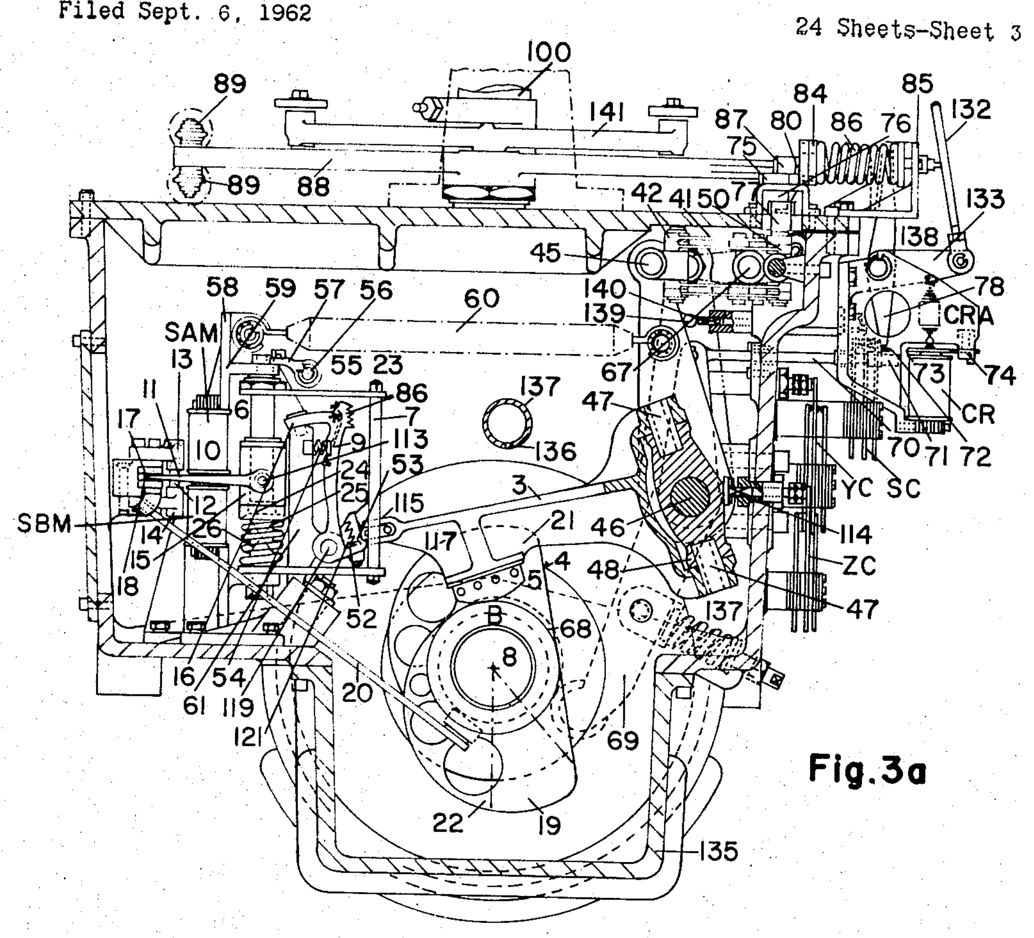
Figures 3B, 3C:
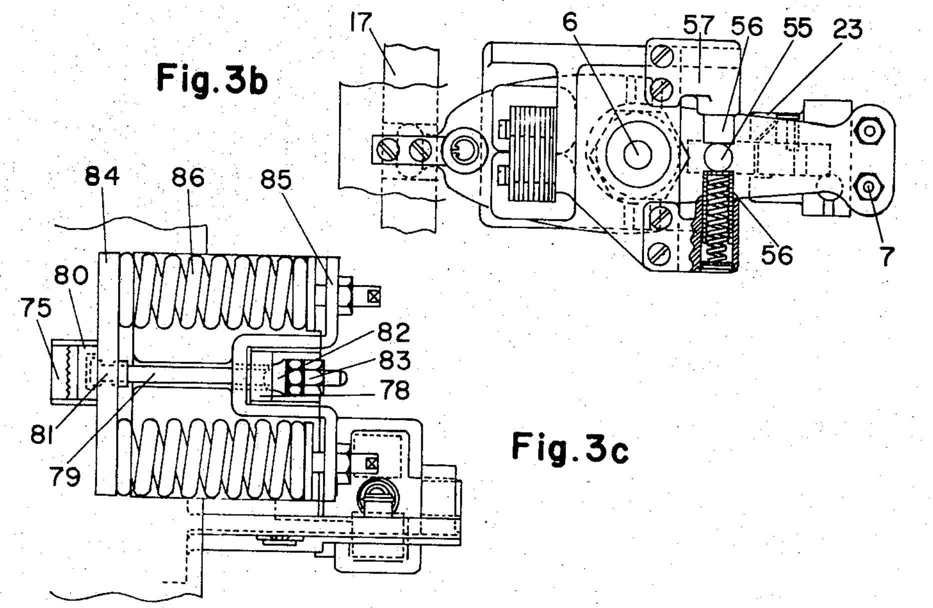

The cam follower levers 3 are therefore pivoted at one end to the cam-operated links 43, FIG. 3, while their other ends engage vertical slots between spaced rods 7, FIG. 3, each pair of which forms part of a code-bit responsive mechanism.

The individual code-bit responsive mechanisms are complex due to the provision of various mechanical safeguards, but so far as the present operational requirements are concerned, each such mechanism consists of a lever 10, 62, FIG. 3 centrally pivoted on a vertical shaft 6, one arm 62 of which carries the spaced rods referred to above, while the other arm comprises a lever 10 horizontally pivoted to the shaft 6 so as to rotate therewith, and carrying upper and lower shoes at outer end. Lever 10 oscillates about its pivot 113 under control of upper and lower electromagnets SA, SB. The shoes on lever 10 are positioned between a pair of parallel horizontal shuttle bars 17, 18, arranged to be oppositely reciprocated lengthwise by centrally-pivoted levers such as 20, rocked by cams 19, so that as one bar moves in one direction, the other bar moves in the other direction. By moving the levers 10 up or down by electromagnets SA, SB, the shoes, are moved into slots in one or other of the shuttle bars 17, 18, while they are stationary, so that consequent movement of the shuttle bars in opposite directions will rock levers 10 correspondingly. The levers 10 will move cam-followers axially from one part of an individual cam assembly 21, 51, 22 to another as dictated by the operational requirements; the complete sequence of operations for each type of change code bit is described later.

A cam-follower lever 3 has a high or "lifted" position when its free end is near the top of the slot between rods, 7, and a "low" position when its free end is near the bottom of the slot. Associated with the trunnion 48, to which the operative end of the cam-follower lever 3 is pivoted at 47, is a pusher rod 114, controlling change-over contacts SC, so that the left-hand contacts are closed when the cam-follower 5 is low, and the right-hand contacts are closed when the cam-follower 5 is high.

Figure 6:
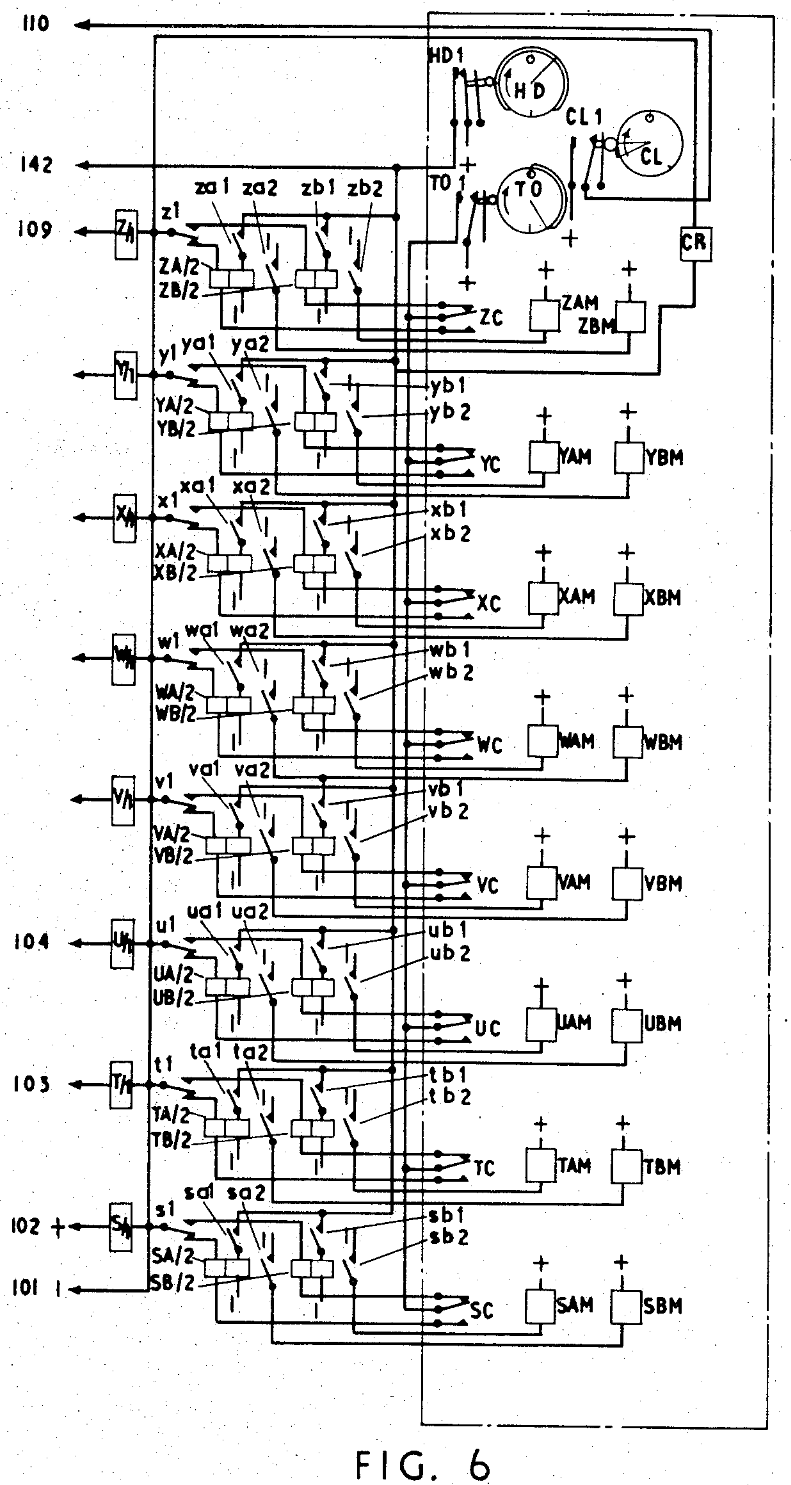
FIG. 6 is a circuit diagram for the disc file.

These contacts SC are incorporated into the code-responsive electrical control circuits, FIG. 6, for use in comparing the present setting of a cam-follower lever 3 with the setting required by a new code. The circuits of FIG. 6 include other controls, but camming control is the function of the individual vertically-arranged binary bit circuits identified by the letters S, T, . . . Y, Z. The S circuit, for example, comprises a binary-bit responsive relay S, which, with relays T . . . Z, are respectively connected to the corresponding binary place leads 102 . . . 109 from a computer, for example, so that lead 102 will carry a positive D.C. signal for a 1 in the $2^0$ place, and so on, lead 109 carrying a positive D.C. signal for a "1" in the $2^7$ place. A common negative D.C. lead 101 is connected in multiple to the other terminals of the relays S . . . Z and to change-over contacts *s*1 . . . *z*1 of each of the said relays S . . . Z. The back and front contacts of each change-over are respectively connected to operating windings of a pair of relays, such as SA, SB forming part of the $2^0$ binary bit circuit. The other terminals of the operating windings of relays SA, SB are connected respectively to the front and back contacts of the SC change-over contacts which are controlled by the position of the cam-follower lever by means of pusher rod 114.

Figure 2:
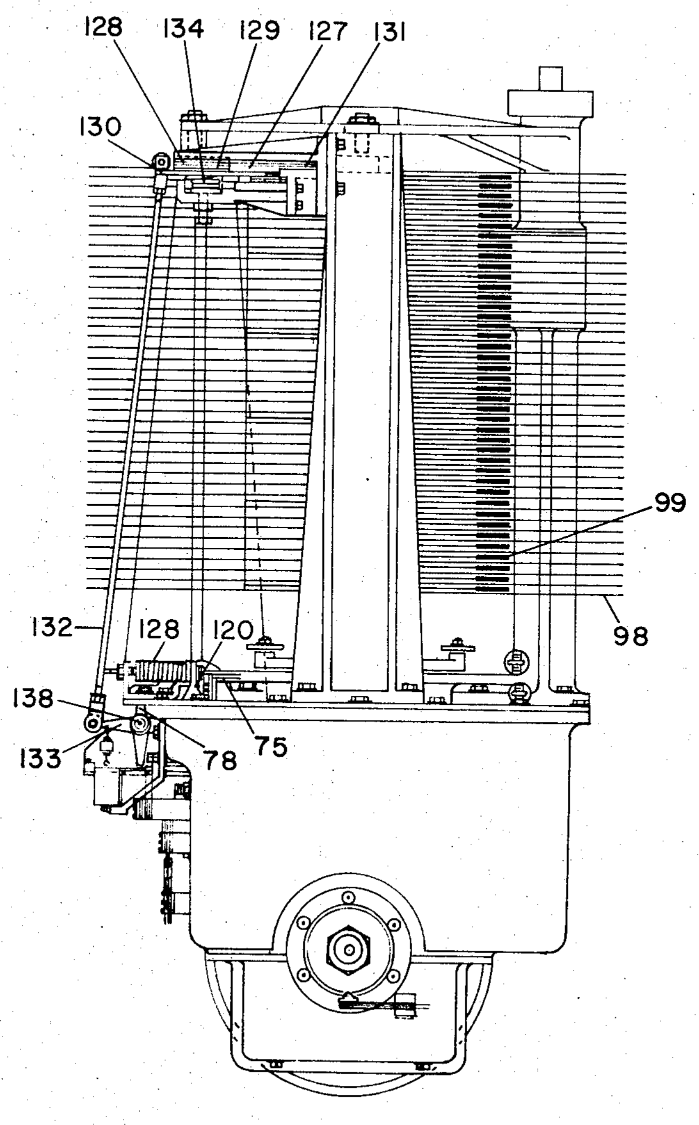

The "0" condition on lead 102 corresponds to the low position of the cam-follower lever, with SC in the position shown in FIGS. 2 and 3. The "1" condition on lead 102 corresponds to the high position of the cam-follower lever 3.

With contacts *s*1, SC both in the unoperated position, or both in the operated position; in each case indicating that no change in setting is required; there is no operating circuit for either SA or SB.

If relay S has operated to a "1" condition on lead 102, indicating that the cam-follower 3 should be lifted, if required; and if contacts SC are in the position shown indicating that the cam-follower lever 3 is required to be raised, then a circuit is closed from negative battery on lead 101 via S1 operated, operating winding of relay SB, SC unoperated to positive battery, via contacts *to* 1 as will be explained later. Relay SB is operated.

Similarly with contacts *s*1 unoperated, and contacts SC operated, relay SA will be operated.

In either case, the relay will lock via its lower locking winding via its own front contacts *sa*1 or *sb*1 to positive battery on contacts *hd*1, the cam control of which will be explained later. Relay SA, or SB, when operated, energises the corresponding electromagnet SAM or SBM, FIGS. 2 and 3, to move the interposer lever 10, FIG. 3 upward or downward so as to insert the corresponding interposer shoe into a slot in the upper or lower shuttle bar 17 or 18, so that the lever assembly 10, 6, and 7 is rocked in the desired direction for initiating lowering or raising of the cam-follower lever 3.

The cam-follower lever 3, FIG. 3 is pivoted at 47 on trunnion 48, which is rotatable mounted on spindle 46, and is rotatably connected to a pair of spaced lever arms 43, 44, FIG. 4, which carry the long pivot-pin 48, FIG. 4.

Slidably mounted on pin 45 is a sliding trunnion 49 carrying the apical pivot e.g. 44 of the corresponding triangular linkage, on which are pivoted together the triangular linkage 41, 42, the other ends of which are pivoted to two sliders 64 on a fixed shaft 66 or 67. The lever assembly 43, 45, FIG. 4 has rotary freedom only, and cannot move axially. The sliders 49, 64 at the corners of a triangular linkage such as 41, 42 and the three sliders, can move axially on pin 45 and on the shaft 66 or 67. There are a number of triangular linkages formed by links 27, 28:29, 30; it will be noticed that they increase dimensionally in turn from 27, 28 to 41, 42. This is because the linkages are designed to contribute horizontal movements respectively proportional to $2^0=1$; $2^1=2$; $2^2=4$; . . . $2^6=64$; $2^7=128$.

The left-hand pivot 42 of the left-hand link 27 is fixed so that the right-hand pivot 50 of the right-hand link 42 is required to be able to move a distance proportional to $1+2+4+8$ . . . $+64+128$, since every possible variant of an 8-digit binary code is to be catered for. If only a selection of the possible codes were used, such as a 3-out-of-8 code, the maximum travel would be correspondingly smaller.

As will be explained below, the change of setting of the aggregating linkage is performed by a simultaneous operation of all those individual linkages which are affected by the change of code. Usually some of the corresponding pairs of bits in two successive codes will be the same, so that the corresponding linkages will not be moved. Some of the other individual linkages will require to be contracted, by moving their apexes downwards, FIG. 4, while other linkages will require to be expanded by moving their apexes upwards, FIG. 4. The simultaneous upward and downward movements of arbitrarily-selected apices, FIG. 4, will result in a shuttling to the right and to the left of the various sliders 49 belonging to all the linkages, as required by the apical movements, so that at the end of the shuttle movements the right-hand point 50, FIG. 4, has moved from a position determined by one code value to a position determined by another code value.

Each cam assembly comprises a lifting cam 21 and a lowering cam 22, on opposite sides of a transfer disc 51, FIG. 4. The cam-follower lever 3 can be rocked on its pivot 47, so that the shoe or follower 5 is in line with the lifting cam 21, or the transfer disc 51, or the lowering cam 22. It will be seen that the movement of a shoe 5 for lifting or lowering consists firstly of a lateral movement on to the lifting or lowering cam, then the lifting or lowering vertical movement followed a return lateral movement into line with the transfer disc. It is clear that the lever 3 must be returned to the central position at the end of each operating cycle, since all the shoes on the levers 10 which rock the cam-follower levers 3, must be in line with the slots in the shuttle-bars 17, 18 at the beginning of a cycle in order that they can be moved up or down if required into engagement with the top or bottom shuttle bar 17, 18.

Thus, the motion of the rocking end of each cam-follower lever 3, looked at from the left, FIG. 3, is rectangular. From the low central position, the free end is first rocked into the paper so as to be in line with the lifting cam 21. The lever is then raised, after which it is returned to the central high position. For lowering, the lever is rocked out of the paper in line with the lowering cam 22, is lowered and thus rocked into its low central position from which it started.

The free end of lever 3 is forked at 115 to receive a block 116 having spaced apertures through which are passed pins 117 one on each side of the rocking rods, 7, so as to pivot lever 3 loosely to lever 7, 62. The block 116 and fork 115 can move longitudinally of the lever 3 with respect to each other without disengaging when the lever 3 is moved between its high and low positions, so as to accommodate the arcuate movement of the end of lever 3. The block 116 carries a toothed dog 118 cooperating with a detail consisting of a vertical arm 9 pivoted at its lower end 119 to a framework post 61 and carrying a support tooth 52 at its lower end, and a vertically-arranged set of support teeth 86 at its upper end.

The detail 9 has an arcuate rearwardly-extending arm 16 at its upper end, slotted for limited longitudinal movement relative to a stud 120 passing through the slot into a fixed post 61, to which the detail 9 is pivoted. A spring 54 between the post 61 and lever 9 maintains the slotted arm of lever 9 against the stud 120, but allows movement of detail 9 in response to pressure due to any operational defect.

The low support 52 carries an upwardly spring-pressed stud 53 with a cam-top which allows the bottom surface of the dog 121 to depress the stud 53 when moved over the support 52 into the paper. The stud 53 rises behind the dog 121 and prevents return horizontal movement out of the paper in the low position.

The upper dog 86 carries a guard lever 23 spring-controlled in a clockwise direction, FIG. 3, so that a nose on the lever 23 covers the bottom tooth gap of multiple dog 86. When the dog 121 on cam-follower lever 3 is lifted, it is vertically in line with the guard lever 23 which is rotated anti-clockwise by the dog 121 so that the dog can be moved horizontally out of the paper into toothed engagement with support 86.

When dog 121 is fully engaged with support 86, guard lever 23 springs back into place and prevents reverse movement of dog 121 into the paper. Thus, the rocking movement of rocker 7 on shaft 6 moves dog 121 from one side to the other of the bottom and top supports 175, 86 into the paper and out of the paper respectively, while the lifting and lowering cams, such as 140, 141, FIG. 4, raise and lower the dog 121 from position in line with support 52 to position in line with support 86, and vice-versa.

The effect of the cam assemblies is to move the cam-follower levers 3 FIG. 3 between two positions, a high position, when the piece part 121, FIG. 3, becomes latched in the dog 86, and a low position as shown in FIG. 3, in which the part 121 is latched to dog 52. In moving between the high and low positions the lever 3 moves the apex of 41, 42 between upper and lower positions, FIG. 4. The distances between the dogs 186 varies according to the binary bit, and for the smallest distances, the upper and lower latching positions can be provided on a single dog, FIG. 7.

The interposer lever 10 is not directly pivoted to shaft 6, but to a barrel 15 axially fixed on, but rotatable with respect to, on shaft 6, and carrying diametrically arranged cam teeth 24 engaging cam slots in a collar 25 rotatably fixed to shaft 6, but axially movable thereon against spring 26. Thus, if attempted rotation of shaft 6 meets with obstruction, the teeth 24 will force collar 25 downwards against spring 26 so that the lever 10 rocks on shaft 6 without doing any damage. The lever 10 is centered between the pole-pieces of the magnets SAM, SBM, by spring-pressed plungers 11, 12 in housings 13, 14. The rocker arms 62 on shaft 6 are centered by a vertical pin 55 on the top arm 62. The pin 55 is positioned between spring-pressed plungers 56 on arms 57 fixed on the framework platform 59.

It is essential that the reading heads shall be accurately positioned on the tracks. The expansion of the smallest triangular linkage 27, 28, that is, the movement of pin 122 laterally with respect to the fixed pivot 112 of link 27; is designed to be $\frac{1}{64}$ of an inch. The expansions of the succeeding linkages are $\frac{1}{32}$; $\frac{1}{16}$; . . . $\frac{1}{2}$; 1; 2; inches. The maximum expansion of the whole array of eight linkages is $\frac{1}{64}+\frac{1}{32}+ \ldots +\frac{1}{2}+1+2=3\frac{63}{64}$ inches, and the aggregation point 50, FIG. 4, can have any one of a series of settings, of which adjacent pairs differ by $\frac{1}{64}$ of an inch, from 0 to $3\frac{63}{64}$ inches. None of these settings must be inaccurate by more than a few thousandths of an inch, and it is not possible with normal manufacturing tolerances to build a series of linkages of such accuracy. Certain expedients are therefore provided to reduce the manufacturing inaccuracies to within tolerable limits. The first expedient is an adjustment with each individual linkage.

The apical pivot 44 of each triangular linkage, e.g. 41, 42, FIG. 4, is carried by a trunnion 49 mounted for longitudinal and rotational movement on the spindle 45 between the free ends of the levers 43. The levers 43 move between two positions under control of the lift cams 21, 22, corresponding to the high lift and low lift cam positions respectively. The portions of the spindle 45 journalled within the ends of the levers 43 are eccentric. The spindle 45 has locknuts at its right hand end, FIG. 4, and a tool-engaging aperture 63 at its left hand end. By loosening the locknuts and turning the spindle by means of a tool inserted at 63, the distance of the apical pivot 45 from the base of the triangle formed by links 41, 42 can be increased or decreased. By this means, the change in length of the triangle base between high lift and low lift positions can be adjusted. By loosening the lock-nut and inserting a tool in the square recess in the left hand end of the eccentric spindle 63, the eccentric spindle can be rotatably adjusted to vary the effective length of the lever arm 44, and consequently to vary the expansion of the triangular linkage in response to a given movement of the cam-follower lever 3. By operating each linkage separately, measuring the consequent movement of point 50, and adjusting the corresponding eccentric 63 until the movement obtained is exact, the major source of inaccuracy is minimised.

Nevertheless, the aggregate movement of point 50 can still be inaccurate. A corrector mechanism is provided to the disc-file end of the steel motion-transmitting tape 76.

The terminating end of steel tape 76 is fixed around one portion of a sector 75 which is fixed on the shaft 79 carrying the read-head arms 74. The sector 75 also carries a toothed sector at the side of the steel-strip bearing surface. The toothed portion of sector 75 has 1/16 inch teeth meshing with like teeth on a corrector block 80. Means, to be described below, and provided for moving the corrector block to and from the sector so as respectively to lock and to free the sector. The corrector block 80 is carried by a shaft 124 top left of FIG. 4, which is axially movable in bearings, and is urged to the left by a spring 123. The shaft 124 is connected by an arm 125 to the slider 65 carrying the common pivot 126 of the second and third triangular linkages, so that the shaft 124 carrying the corrector block 80 follows the movement of pivot 126. Pivot 126 can be moved 1/64, 2/64, or 3/64 of an inch to the right from the closed position of the linkages, according as the first, or the second, or both, of these linkages are expanded. All three such movements are individually less than the pitch of the teeth of corrector block 90, and they cause simultaneous movement both of the steel tape 76, and sector 75 to which such movements pass via the array of linkages and point 50; and of the corrector block 80. All other linkage movements are 1/16 inch (which is the pitch of the corrector teeth) or multiples thereof, and the consequent movement of tape 76 and sector 75 (but not of corrector block 80) should bring the teeth of sector 75 and of corrector block 91 into relative positions in which they will correctly engage. If however, inaccuracies have left the sector slightly out of mesh, it will be drawn into mesh by the entry of the teeth of the corrector block, the position of which is accurately defined, and the lateral motion of which is an overall travel of 3/64 of an inch only.

The movement of the corrector block 80 to engage and to free the sector 75 is controlled as follows. A cam 68, FIG. 3, on the main cam-shaft 8 controls a two-armed cam-follower lever 69, the other end of which is pivoted to a longitudinally-movable rod 70 carrying at its rear end a dog 71 with an upwardly-extending tooth vertically in line with a slot 73 in the armature CRA of an electromagnetic relay CR.

The armature CRA is mounted to pivot and slide at its right-hand end 74 and its left hand end is in slotted engagement at 72 with the lower end of a two-armed lever 78, the upper end of which is connected to the corrector block 80, by a horizontal rod 79 with semi-spherical ends 81, 82 to allow for the lateral movement of block 80 which is required.

The rod 79 also passes through end plates 84, 85 held apart by springs 86 which normally hold the corrector block 80 firmly in mesh with sector 75. The semi-spherical bearing 82 is longitudinally adjustable by lock-nuts 83 to vary the effective length of rod 79.

When relay CR is not energised, rotation of cam 68 reciprocates rod 79 idly. When relay CR is energized, its slidable armature connects dog 71 to lever 78 and the movement of dog 71 under control of cam 68, operates levers 78 to withdraw the corrector block 80 from sector 75 to allow a change in setting of the sector 75 and of the reading arms 90 via steel tape 76.

The return of cam 134 to normal allows the corrector block to return into mesh with sector 75 and to correct its position for any slight inaccuracy in its setting.

Shaft 100 carrying the reading arms 90 is driven at its lower end. Although of substantial diameter, the rapid acceleration of this shaft 100 causes a slight deflection resulting in an overthrow on the highest arm of one and a half thousandths of an inch after a full travel from track one to track 256. This would produce a slight oscillation on these arms and therefore a damper is fitted to control this oscillation. In FIG. 2, the reading arm shaft is coaxial with the file, and carries a radially-extending steel plate 127, FIG. 2, on which the damping means operate.

The damping means consist of two friction pads 128, 129 for applying pressure to opposite sides of plate 127, when the corrector block is in engagement with the sector 75. Upper pad 128 is fixed. Lower pad 129 is mounted on a pressure plate 130 carried by a leaf-spring 131 and controlled by a connecting rod 132.

To retract the damper, an arm 133 fixed to the corrector withdrawal lever 78 pulls down rod 132 when the Read Heads are to be adjusted. Pressure plate 130 swings on leaf spring 131, compressing a helical spring 134. When adjustment of the Read Heads is completed, the corrector block is clutched in to sector 75, and plate 130 is released by the corrector lever, so that spring 134 again applies the damping pad 129 to plate 127.

The cam shaft 8 is connected to the drive pulley 95, FIG. 4, via a conventional spring drive FIG. 8, designed to allow slight relative rotation of the shaft 8 and pulley 95 when the shaft is heavily loaded during a code change.

Referring now to FIG. 8, a boss 143 with two diametrically-opposed radial arms 144 is keyed to shaft 8. The pulley face carries two pairs of buffer springs 145, each pair embracing and positioning one of the radial arms 144 which are fixed to the shaft 8. The buffer springs are powerful enough to give a solid drive between pulley and shaft except during heavy load, when the springs will tend to give to the extent of about 2°. Since the "give" may result in oscillation, the back of the pulley carries friction pads 146 against which is located a steel disc 147 rotatably fixed to the end of the shaft 8. A cover 148 fixed to the pulley carries a set of spring-pressed friction pads 149 pressing on the disc 147, thus completing a damping device to damp out any possible oscillation of shaft 8.

The cam assembly is partly immersed in an oil bath 135, and the cams are sprayed with oil via holes 136 in an oil pipe 137.

The circuit diagram, FIG. 6, shows change-over contacts SC . . . ZC for indicating the lifted and lowered positions of the eight cam-follower levers. Some of these change-overs are shown at the right hand side of FIG. 3. The maximum lift cam lever, shown in FIG. 3, operates its contacts ZC by a cam plate 138 on trunnion 48 via a push-rod 114. A suitable method of operating the change-overs for the smaller lift cam levers is indicated in respect of SC which is operated by a pin 139, FIG. 3, which is fixed to the side of a lever 43 and which operates push-rod 140. The cams CL, TO, HD, FIG. 6, are indicated.

While the lower order linkages only expand by 1/64, 1/32, 1/16, 1/8 of an inch, the movements of the respective cam-levers are all the same; namely 1/8 inch. The necessary adjustment to reduce the common movement by differing divisors in the various linkage drives is provided for in the individual designs of the triangular linkages and their drives.

It will be noticed that the length of the linkage array has been reduced by providing two base-line shafts 66, 67, FIG. 4, and by overlapping the last two triangular linkages 39, 40 and 41, 42.

In order to be able to remove the Read Head arms 90 quickly from the file to allow for removal and replacement of discs stacks, the two-armed Reading Head lever 88, FIG. 3, which carries tape sector 75 and toothed corrector sector 87, and which is rotated by the tape 76 against helical springs 89, is not fixed direct to the Read Head shaft 100. A short two-armed lever 141 is fixed to the shaft 100, and is removably bolted to the lever 88 for quick release.

Figure 7:
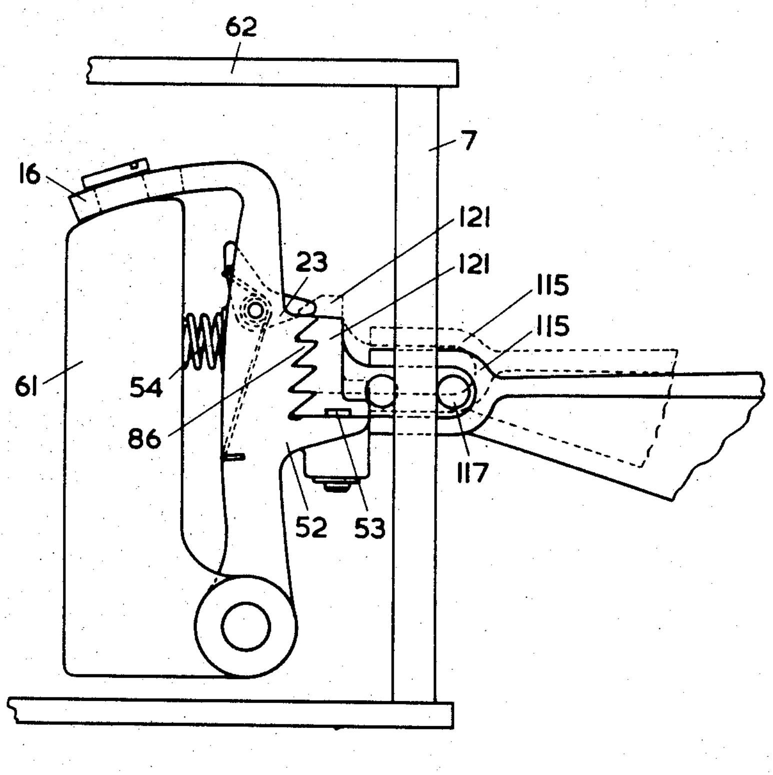
FIG. 7 shows low-lift cam equipment.

FIG. 7 shows how, for the lower order movements, a single support member combines the features of the upper and lower supports of FIG. 3. The upper and lower positions are one tooth apart, the guards 23, 53 being correspondingly positioned.

Figure 5:
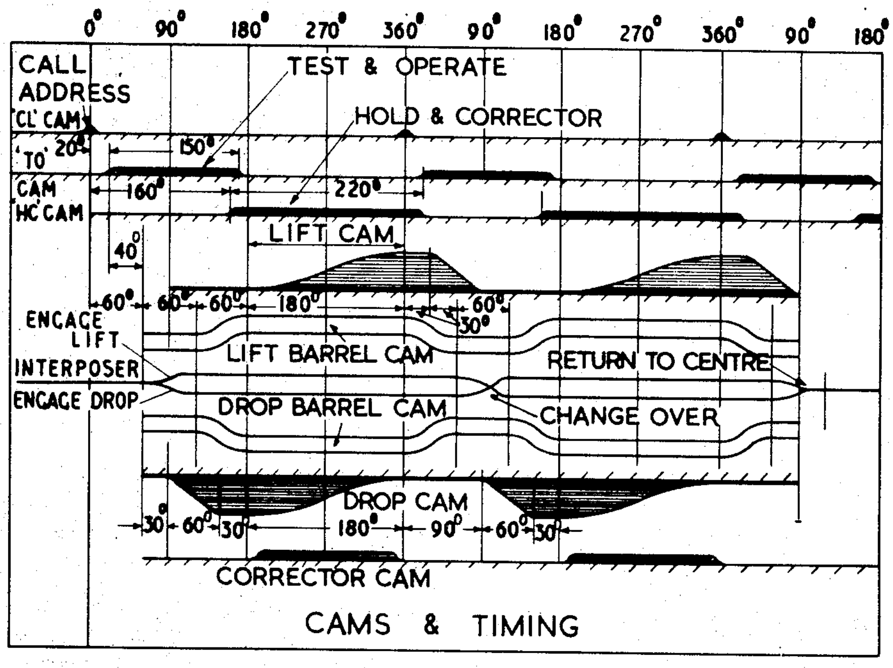
FIG. 5 is a timing diagram for the operational sequence of the disc file.

FIG. 5 is a timing diagram showing the relation between the various controls of the track selection sequence. The cam shaft 8 carries, in addition to the series of lift-and-lower cam assemblies 21, 51, 22, the barrel cam 19 for operating the shuttle bars 17, 18, and cams CL, TO, and HD, FIGS. 1 and 6, controlling various portions of the repetitive selection cycle. The curves show against the angles and times of rotation of the cam shaft, the operation of the selecting mechanism as a whole, the datum line being the Call Address signal to the computer.

The top three waveforms show the timing of the three operational cams CL, TL, HC, on the end of the camshaft, FIG. 3, which are concerned with code reception from a computer, or the like. The next five waveforms show the timing of the mechanical movements by which selection is performed, while the bottom waveform shows the timing of the corrector equipment for lining up the Read Heads accurately.

The first operation is the closure of contacts CL1, FIG. 6 by cam CL at 0°, to signal via lead 110 to the computer, or other source of control signals. If the computer has a signal ready, it is sent on leads 102 . . . 109, FIG. 6, to operate a selection of the relays SA, SB . . . ZA, ZB, according to the criteria previously discussed. This signal is received in the period 20° . . . 170° during which cam TO closes contacts TO1 to apply positive battery to the change-over contacts SC . . . ZC, FIG. 6. The operated relays among SA . . . ZB lock to contacts HC which are closed at 160° and remain closed until 20° in the next cam shaft rotation.

Operation of a selection of relays SA . . . ZB operates in turn the corresponding interposer magnets among SAM, SBM . . . ZAM, ZBM, in readiness for the barrel cam to reciprocate the shuttle-bars 17, 18, between 180° and 360° and rock a corresponding selection of cam-follower levers 3 to place the selected levers above the respective lifting or lowering cams.

It will be noted from FIG. 5 that the Interposer change-over takes place during a 60° rotation period, the start of which is delayed by some 30° after the end of the HC cam due to the combined release times of the relays SA, SB and the magnets SAM, SBM, for example. While the levers 3 are so held, the active portions of the lifting and lowering cams pass under the cam-followers, and change their positions as required, reorganising the settings of the triangular linkages according to the new code.

The barrel cams then return the cam follower levers to neutral position during the first 60° of the next rotation.

At 20° in the next rotation, the operated relays among SA . . . ZB are unlocked so that they release, followed by the corresponding magnets among SAM . . . ZBM. As a result, the interposers return to normal, FIG. 1, during 150° . . . 200° of the second revolution.

During the closure of the Hold and Corrector contacts HC, the Corrector relay CR, FIG. 6, is energised, causing the corrector block, FIG. 3, to be withdrawn from the Reading Head lever sector 87, so as to allow the Reading Head lever freedom of movement while the "lift" and "lower" cams are changing the Reading Head position.

The corrector cam 68 controls the damping of the Reading Head shaft 100. It will be seen from FIG. 5, that the damping period starts 20° after the corrector block 80 is retracted and finishes 20° before the corrector block 80 again engages with the toothed sector 87. Thus the shaft 100 is held steady during disengagement and re-engagement of the corrector gears.

It will be remembered that the disc file performs two revolutions for each revolution of the cam shaft. It will be seen that during 0° . . . 180° of each cam shaft revolution, the Read Head setting is locked and reading can take place.

The Hold and Correct cam HC, FIG. 6, also signals via lead 142 to the Computer to remove the current binary code from leads 102 . . . 109 and to apply the succeeding binary code in readiness for the next closure of the TO cam contacts. In this way, quick and reliable operation is ensured.

The extent of electrical control of the selection movement can be greatly increased and the mechanical movement correspondingly simplified as shown in FIGS. 9 and 10 which show a cross-sectional elevation and a plan view of a modified linkage-operating equipment.

The triangular linkage 41, 42 is still operated from levers 43 on spindle 46, but the levers 43 are now provided with a flat hardened steel bar 205 extending between the levers, and cooperating with a fixed latch 215 and a rotatable latch 208 carried by the armature of an electromagnet 212.

The upper part of the face of bar 205 is recessed at 211 to receive the end of one or other of two pusher rods 206, 209, which control forward (to the right, FIG. 9) and return movement of lever 43. The pusher rods 206, 209 are reciprocated by cams 207, 213, on camshaft 8 through spring-controlled cam-follower levers 217, 216.

The pusher rods 206, 209, are pivotally carried by roughly vertical links 210, 204, operable by the armatures of two electromagnets 202, which effectively replace the magnets SA, SBM of FIG. 3.

The armature of each magnet 202 is normally in the raised position under the influence of compression springs 218 so that the pusher rods are raised above the bar 205 and reciprocate idly.

The forward pusher rod 206 has the function of pushing the bar 205 and lever 43 to the right, FIG. 9, against the spring 214, while the return pusher rod controls the return movement of the lever 43 under the influence of spring 214.

While the current controls for the modified mechanism will vary in their timing from those shown in FIG. 5, the same arrangement of S, SA, SB . . . ZA, ZB relays can control the magnets 202 instead of the magnets SAM, SBM, FIG. 6. The effective stroke of the lever 43 is determined by the two latches 215, 208. Since the purpose of the latch 208 is to hold the bar 205 in its forward position, magnet 212 will be operated to release the bar 205 and lever 43 for the return movement, and will therefore be synchronized with the return cam.

It will be seen that the rocker movement of FIG. 3 has been eliminated, and the mechanical movements greatly simplified.

For a forward movement of lever 43, the forward control magnet 202 will be operated to lower the forward pusher rod 206 so that its nose is horizontally in line with recess 211.

The forward cam now moves its pusher rod to the right, FIG. 9, and so moves bar 205 away from latch 215 against which it was resting. The pusher rod moves the bar 205 on lever 43 over and slightly past latch 208 which rides up behind bar 205.

For return movement, the return magnet 202 lowers its pusher rod into recess 211. The return cam now moves the bar 205 slightly to the right to disengage from the latch 208, which is then lowered by magnet 212.

The return cam now allows the pusher rod to move to the left, FIG. 9, in a controlled movement under the influence of spring 214, until the bar 211 again rests against the fixed latch 215.

Referring now to FIGS. 11 and 12, the Read Heads are mounted on arms 307, 308, arranged on the track selection shaft (not shown), similar to shaft 97 above, by means of which the heads 303, 304 can be moved substantially radially of the discs 301, 302, to the different tracks.

A collar, fixed to the track selection shaft carries the slotted holder 317. The ends of the arms 307, 308, are riveted in the slot in the holder 317, so that the arms 307, 308 can be angularly moved by the track selection shaft. Mounted on the top, FIG. 12, of the holder 317 is a fluid-pressure control cylinder 319 which is shown enlarged and which contains a spring-controlled piston assembly connected to a piston-wire 306 which extends parallel to the arms 307, 308 and is pivotally strapped to the upper crank, FIG. 12, of a double-crank control rod 305.

The intermediate parts of rod 305 pivotally engage within hooked side extensions on the arm 307, and the main crank portion of control rod 305 engages the back of Read Head 303. The read heads 303, 304 are radially staggered. The heads 303, 304 are also universally mounted. Pins 313 in lugs 316 on arm 308 carry a gimbal 315, which in turn carries pins 314 on which head 303 is pivotally mounted. Similarly, plate 307 has two lugs 312 between which a gimbal 309 is pivoted on pins 310: the head is pivoted by pins 313 in gimbal 309.

It will be seen that the main crank of member 305 extends between the hooked ends of plate arm 307 and the back of head 303 carried by plate arm 308, so that anti-clockwise rotation of the main crank of member 305 on its pivots in the hooked ends of plate arm 307 will tend to force arms 307, 308 apart. The arms 307, 308 are sufficiently resilient to be able to be sprung slightly apart as indicated in FIG. 11.

The relative dimensions of the parts is such, that when the piston assembly 318 of fluid-pressure device 319 is pressed to the left by its spring, the crank member 305 is in the position shown in FIG. 11, and holds the read heads 303, 304 closely against the discs 301, 302. Thus, the heads can adjust themselves in close parallel relation to the discs 301, 302 and are only separated therefrom by air films.

When it is desired to change the setting of the read heads of the disc file, fluid pressure is admitted to the left hand end of cylinder 319 (the ports are not shown), and of the cylinders controlling all other magnetic head pairs, and overcomes the piston spring pressure, so that the arms 307, 308 will spring together turning crank member 305 clockwise and pulling the wire 306 to the right.

When the read heads have been set to a new position, the outlet ports of cylinders 319 are opened. The piston springs now take control and turn crank members 305 to spring the pairs of arms 307, 308 apart and to bring the magnetic heads into reading position.

The track-selection shaft is operated from the aggregate motion of the triangular linkages discussed above. Previously, the cams have been continuously rotated, and, in consequence, an operational sequence could only begin at specific time intervals. Alternatively, the camshaft can be normally stationary, positioned at the start of a setting change sequence. Clutch means are then provided for clutching the camshaft to a constantly rotating coaxial shaft, to initiate a change-of-setting sequence immediately such a change is required. For this purpose, the band clutch shown in FIG. 13 is suitable.

A clutch drum 321 is fixed to a continuously rotating shaft and carries a friction band 320, to which is fixed a lug engaging a slot in arm 322 on the cam shaft, which is coaxial with the drive shaft. If the band 320 is tightened on the drum 321, the cam shaft will be driven by the drive shaft.

The open friction band 320 is of spring material and will grip the drum 321 tightly due to its resilience to drive the cam shaft unless it is expanded. The ends of the band 320 carry radial lugs 328, 329.

The arm 322 also carries bearings (not shown) for the pivots of a rocker 330, which carries three rollers 326 in a through-and-through slot, the outer rollers being proud of the ends of the slot so as to engage the lugs 328, 329, and give substantially frictionless rotation of the rocker between the lugs 328, 329. The rocker pivot is coaxial with the centre roller 326. The cam profiles required for controlling the triangular linkages are repeated twice around the circumference of the cams, each complete profile requiring half-a-revolution. Because of this, the cam shaft may be started from either of two positions 180° apart in order to initiate a cam operation without delay. The rocker 326 carries a radial lug 327 and at two diametrically opposed positions around the periphery of the clutch are two electromagnetically controlled pivoted stops 323, 325, each linked to the armature of an electromagnetic relay such as 324. As shown, the rocker lug 327 is in contact with stop 323 and has been rotated so as to separate band lugs 328, 329 and so to render the clutch inoperative.

When the camshaft is required to operate, relay 324 is energised so that stop 323 is pulled to the left, and rocker 323 rotates anti-clockwise due to the pressure of the lugs 328, 329. The friction band 320 grips the clutch drum 321 and the camshaft is rotated for half a revolution until the rocker lug 327 engages stop 325, so that the rocker is rotated, and the camshaft is declutched and stops. The next cam operation will be from stop 325 to stop 323 and so on.

In the arrangement of cams and pusher rods in FIGS. 9 and 10, the pusher rods did not follow a truly linear path. FIG. 14 shows the crossbar 332 mounted so as to be rotatable on studs such as 341 carried by the linkage operating levers 336. A horizontal link 334 is fixed to crossbar 332 and is pivotally connected to the upper end of a lever 335, the lower end of which is pivotally mounted on the axis spindle of the cam followers 342, 343. The link 354 is the same length as the length of the base line between the pivots 344, 345 of the cam followers and of the levers 336 respectively, so that the levers 342, 343, and 336; and the links 334; constitute a parallelepiped.

The crossbar 332 carries two shouldered latching members 333. The horizontal pusher rods, or interposer rods, 330, 331 are pivoted as before to the cam followers 342, 343, and are linked by vertical links 346 to the armatures of electromagnets such as 347 for lowering and raising the pusher rods 330, 331 into the shoulders on the latching members 333. Because the crossbar 332 is now fixed to link 334 and is rotatable on the studs 341, the crossbar maintains a vertical stance throughout its horizontal movement.

Thus, when a pusher rod 330 or 331 is pulled down by its link 346 so that its right hand end engages the shoulder of the respective latching member 333, and the pusher rod then pushes the crossbar 332 to the right, the vertical surface of the latch shoulder remains vertical throughout the movement of the crossbar, and there is no danger of the pusher rod slipping out of the shoulder.

FIG. 15 shows a modification of FIG. 14 in which the levers 336, 342 are controlled by compression springs 350, 351. Instead of the long pawl 337 being fixed to the frame, it is formed at the rear with a bearing plate 352 carrying a rod 353 passing through the frame 356 and carrying a terminal plate 355 between which and the frame 356 is a buffer compression spring 354, which holds the plate 352 firmly against the frame 356. If now, the crossbar 352 is incorrectly freed by the short pawl 358 at a time when the crossbar 332 is free to move the left, urged by its spring 350, the spring 354 will take the shock of the impact of crossbar 332 on pawl 337. Other buffer springs may also be fitted.

A second set of cam followers, pusher rods, and linkages may be mounted on the left hand side of the cam 339, 340, and also operated thereby.

The control circuit for FIG. 14 is shown in FIG. 16. The timing of the circuit is controlled by the cams CA, CB, CC, CD shown thereon: these cams are fixed to the main camshaft to rotate therewith continuously. Since each half revolution of the main cam shaft can control a complete change of setting of the disc file, two sets of contacts are associated with each of the four timing cams at opposite ends of a diameter.

In FIG. 14, the linkage operating cams 339, 340 are substantially cylindrical, but are mounted on the shaft with their longest radii 180° apart. Thus, in one half revolution, cam 340 can act to push its pusher rod 331 and lever 336 to the right to open its triangular linkage to its UP condiion, while in the second half revolution, cam 340 can control the return of rod 330 and the linkage to the DOWN position.

During the same revolution, cam 339 can control the linkage movements in the opposite order. Thus, either movement of the linkage can be controlled in each half revolution.

The circuit of FIG. 16 is the control for a single aggregator stage, except for some common equipment. The individual circuitry is provided for each of the 8 stages. The circuit is computer controlled, the computer applying an 8-element binary code on 8 parallel wires, one to each circuit, FIG. 16. The rocker arm 336, FIG. 14, operates changeover contacts such as SC, FIG. 16, which are in one position when arm 336 is in the UP position, and in the other position when arm 336 is in its DOWN position. The circuits above SC, the two small bottom circuits and the cam contacts e.g. CA1, are common to all stages. The position of the changeover contacts such as SC is the essential differentiating factor between the individual stage circuits.

Assume that the control circuits have successfully completed a setting of the aggregator, and the read arms, and a signal has been sent from the comparator at the bottom of FIG. 16 to the computer that the disc file is correctly set according to instructions. The computer will now carry out whatever programme it has involving the existing setting of the file and when a new setting of the file is required, the computer will apply a new multi-element binary code to the FIG. 16 circuits, of which the respective element will be applied as "1" or "0" to trigger TR1, FIG. 16. At the same time an Information Available signal will be applied at gate G8. Changeover contacts in the position shown indicate that the linkage is UP or opened out, in which case code signal "0" indicating that the linkage should be moved to DOWN results in a signal via G12.

According to which half revolution is in progress, contacts CD1 or CD2 will open G13 or G8 to operate Interposer magnet I1 or I2, and CB1 or CB2 will operate the latch magnet L. Since the stage is already UP, and lever 336, FIG. 14 is latched forward, the Interposer magnet acts slightly in advance of the latch magnet under control of the timing cams, so that cam 339 or 340 can push lever 336, via the corresponding pusher rod, slightly to the right to allow the latch to be withdrawn, after which the main cam and the pusher rod govern the return movement of the linkage and lever 336 to the DOWN position.

Similarly, if the linkage is DOWN and the signal "1" is required, G11 opens, TR3 operates, and one of the gates G10, G14 is opened by cams CB, CD in the correct order for UP movement. The signal from TR2 on lead E also opens G20 under control of corrector cam contacts CC1 or CC2 to operate the corrector magnet, FIGS. 3, 4, to withdraw the corrector latch from the sector on the read arm shaft to allow the shaft to rotate.

In order to allow the change of setting without interference, according as contacts CA1 or CA2 have originated the cycle, that same signal will cooperate with the output E from TR2 to operate TR5 or TR6. The same gates G16, G18 are also used with a later CA signal to start the comparator, but whichever of TR5 or TR6 is operated will prevent gate G18 or G16 from controlling the other trigger. Thus, if CA1 starts the cycle, only CA1 can start the comparator, and similarly with CA2.

It is clear that an indication can be obtained from the mechanism, of the new Read Arm shaft position: automatic equipment for this purpose is in fact shown in FIGS. 25, 26 and is described later. For checking that the instructions have been correctly carried out, the instructions recorded on the 8 triggers TR2 and the final position indication are automatically applied to the comparator and are compared under control of TR5, TR6. If the comparison is successful, the comparator gives a Proceed signal to the computer, and via G21 gives a Reset signal to reset all the triggers. If comparison is unsuccessful, the comparator gives a Repeat signal to the computer together with Reset via G21.

So far, separate cams have been arranged to perform the push and pull operations on each linkage stage in the same time period, and some method of rendering one or other cam operational at a time has been provided. It is, however, possible to have the push and pull cam surfaces in sequence around the same cam surface and use them at different times. This necessitates starting the two operations from different angular positions, and since simultaneous push and pull operations at the different stages usually form part of a change of setting of the aggregator, it is not possible to have the cams for all stages fixed to the shaft in unalterable positions unless the individual pulls and pushes for the different stages are to take place sequentially.

By providing each individual cam with its own clutch and brake, and by declutching the cams between settings, it is possible to leave the cams standing in the angular positions in which they stopped after the last operation. In this way, after pushing, a cam stands ready to pull, and vice-versa.

This involves axially longer individual cam assemblies and it may be desirable to have these assemblies alternately on opposite sides of the linear aggregate motion stages which the cams operate, so that the adjacent cam assemblies can axially overlap.

FIG. 17 shows a cam disc 360 with an endless cam groove 361 in one face having its follower 362 forming part of the lever, the other arm of which 363, is slidably connected to the apex 364 of a linkage stage 365. The individual clutch and brake for each cam disc will be described below in relation to FIGS. 18, 19. As shown, the linkage stages 365, 366, 367 are alternately on opposite sides of the linear aggregating members 368 slidably mounted on guide rods 369, and there are two continuously rotating cam shafts 371 on opposite sides of the aggregate motion, driven in opposite directions from a common shaft. Each cam disc is carried by a freely rotatable sleeve 372 which also carries a clutch plate 373 between an electromagnetic drive clutch 374 and an electromagnetic brake 375. The sleeve 372 also extends in the other direction and carries a commutator disc 376. The periphery of disc 376 has three tracks side by side: two commutator tracks 377, 378 carry four successive 90° copper strips, alternate strips being located in 377, 378 in turn. The third track 379 carries an endless copper strip. Fixed wipers will be arranged in contact with the three tracks. The 90° strips on 377, 378 are laterally connected below the tracks to the band on 379.

Referring now to FIG. 20, the electromagnetic clutch C and brake B have parallel circuits only one of which can be operated at a time under control of the changeover contacts *rl*1 of a relay RL. The relay can be replaced by an electronic device. The wipers of the two commutators 377, 378 are respectively connected to the "1" and "0" leads of the corresponding binary element of the multi-element binary code controlling the aggregator. When the corresponding aggregator stage is standing in the position corresponding to a signal on the lead "1," the corresponding wiper will be standing at the beginning of a non-conductive sector, while the "0" wiper will be standing at the beginning of a conductive sector.

If then a code is applied to lead "1," it will be without effect. If the applied element was "0," potential on the "0" lead will compete a circuit via the commutator to operate relay RL. Contacts *rl*1 will changeover, and the clutch C will be energised in place of the brake B so that the clutch plate 373 will rotate with its cam disc for 90° to change the setting of its aggregator stage.

After 90° of rotation, the circuit of RL is opened by the commutator: contacts *rl*1 fall back, and the brake B is applied to stop plate 373 and its cam disc. Each cam assembly will similarly be controlled by the corresponding code element. FIGS. 18, 19 also show an alternative aggregate motion operable from the same cam shaft, or from a pair of camshafts sharing the function of a single cam shaft. In this arrangement, the linear movement is obtained by two parallel longitudinally arranged lines of like helical racks 380.

The racks in each line, FIG. 19, are spaced, by a distance less than the length of a rack, and the centres of the racks in each line are laterally opposite the centres of the spaces in the other line, so that the ends of a rack in one line overlap the ends of the adjacent racks in the other line. All the racks are guided so as to be free to move longitudinally in the lines of racks, except for the extreme rack in one end, the outer end of which is anchored to the frame. Laterally across the overlapping ends of each pair of overlapping racks, one in each line, is a spindle 381 carrying spaced helical gears, one of which meshes with each overlapping rack 380. The gears on a spindle are of opposite hands so that the associated racks are moved in opposite directions thereby. The spindles 381 are rotatable, and movable longitudinally by cam followers 382 cooperating with cams 370 on shafts 371 to act as rigid connections between racks 380. Longitudinal movement of the spindles will expand or contract the line of racks, and movement of a rack will move its associated rack in the other line through the intervening spindle. The free end of the final rack is connected to the torque amplifier, FIG. 21. The angle of slope of the helical gears 382 varies from stage to stage in binary order.

It will be noted that the cam follower linkage 382 and spindles 381 for each stage always remain in the same plane without lateral movement.

In order to allow the equipment to work at peak speed, and to facilitate starting and stopping of the magnetic head movement, a torque or servo amplifier of novel type is inserted between the aggregate motion equipment and the read shaft. The aggregate motion equipment is arranged so that each individual movement consists of an acceleration period followed by a deceleration period, as will be described later with respect to FIGS. 22–24, so that in the aggregate, the motion applied to the torque converter is movement in one direction or the other consisting of an acceleration period followed by a deceleration period. The torque converter supplies the power to drive the read arm shaft to a required angular position under the direction of the aggregator.

The torque converter consists of a shaft 400 carrying a helical worm gear 401, FIG. 22, on which is carried a gear wheel 402 with internal helical teeth meshing with the shaft gear 401, and with peripheral gear teeth for meshing with a drive wheel for the read arm shaft.

Journalled on the shaft 400 on opposite sides of the gear wheel, are two independently rotatable drive gear wheels 403, 404 which are driven in opposite directions at a constant speed by an electric motor M, FIGS. 22–24 which will be described later. The gear wheels 403, 404 are mounted on thrust ball bearings 405, 406. A multiplate friction clutch 407, 408 is provided between each drive wheel 403, 404 and the gear 402.

Each wheel 407, 408 carries a cylindrical housing 409, 410 formed with three or more spaced longitudinal slots 411 parallel to the axis. Similarly, the gear wheel 403 carries two cylindrical extensions 413, 414, one on each side, which are of much smaller diameter than the housings 409, 410 and which are axially coextensive with the said housings, the extensions 413, 414 are formed with three or more spaced longitudinal external grooves 415. Between each housing 409, 410 and its opposing extension 413, 414 are housed a series of friction plates 412 which are alternately of steel and of sintered bronze and which are externally and internally toothed alternately for rotational engagement with the housings 409, 410, and the extensions 413, 414 respectively.

As the complete mechanical selection and drive equipment is mounted in a closed housing which is internally sprayed with oil during use, oil will pass through the slots in the housings 409, 410, and there will be oil films between the clutch plates. Sideways pressure on either clutch assembly will force the set of plates therein into friction engagement, and the extent of slip between the plates will depend on the lateral pressure thereon.

Slight axial movement of gear wheel 402 in one direction or the other from its idle central position will bring the corresponding clutch into action. Direction of movement of wheel 402 depends on the relative rotation of the converter shaft and gear 402. Normally, with the read heads and the aggregate motion stationary, gear 402 is standing stationary free of both clutches, and the driving wheels and clutches are rotating idly in opposite directions.

Movement of the aggregate motion in one direction or the other will result in the converter shaft 400 being rotated in the corresponding direction by means of gear wheel 416 as described below, and the gear 402 is moved sideways on the helical worm 401 on the converter shaft 400 into contact with one or other clutch 407, 408 which starts rotating the gear 402, through which the read head shaft is rotated as described below. The constant acceleration of the aggregate motion accelerates the converter shaft and keeps the gear 402 against the clutch with which it is in contact until the aggregate motion reaches its peak speed and begins to decelerate when the converter shaft speed will fall below the speed of rotation of the driven gear 402, so that gear 402 will now move sideways in the opposite direction towards the other clutch.

The inertia of the magnetic head assembly will keep it in rotation but gear 402 will now be decelerated by the oppositely-rotating clutch so that gear 402 and the read head shaft will be slowed down to a standstill, the final position being determined by corrector mechanism.

In the final position, the stopping of both the converter shaft 400 and the read head shaft move the gear 402 to its central idle position.

FIGS. 22, 23, 24 show the servo-amplifier and read arm drive assembly. In FIG. 24, the cam shafts 371 indicate the position of the aggregator in the lower part of the housing 420, in the upper part of which is mounted the amplifier, the read arm assembly 421, 422 and the horizontal stack of magnetic discs 423. A vertical main drive shaft 424 is driven by an electric motor M, and in turn drives the disc shaft 425 through gearing 426.

The shaft 424 also drives a horizontal shaft 426 through helical gears 427. Shaft 426 carries a wide gear 428, which drives the gear wheel 404 of the servo-amplifier direct, and which drives the gear wheel 403 of the servo-amplifier in the opposite direction of rotation via gears 429, 430 on a countershaft 431. The centre gear 402 of the servo-amplifier is in mesh with a gear on the upper portion of a sector 432 on the read arm shaft. The terminal point of the aggregator is linked at 417 to the two-armed lever 418 on a shaft 419. The other end of the lever 418 is pivotally connected to a vertical rack 433 also in mesh with gear wheel 416 on the servo-amplifier.

Thus the aggregator movement is relayed via lever 418, vertical rack 433, and the amplifier gears 416, 402 driven by 403 or 404, rack 432 to the read arm shaft 421.

Only the upper part of sector 432, FIG. 23, is required to give the angular movement to set the read arm shaft 421 selectively. The lower part of sector 432 is formed with teeth 434 having a pitch corresponding to $^{16}/_{256}$ of the total read arm swing from the inner to the outer track, that is, corresponding to $^{1}/_{16}$ of the total swing. These teeth are very accurately cut, and they cooperate with corrector teeth 435 on the head of a corrector arm 437 pivoted at 436. A spring 438 urges the arm 437 towards the rack 432. A cam 439 on the cam shaft 371 controls a two-armed lever 440, the upper end of which engages a backstop 441 with the corrector head 436 to move it away from the rack 432 for 90° rotation of the camshaft 371 during each setting cycle of the aggregator.

The sector 432 is of course rotated through a peripheral distance equal to 1/16 pitch of the corrector teeth for each bit of the multi-element binary code, and as the rack moves through 16 such distances the teeth on the rack are first getting progressively out of line with the corrector teeth and then moving progressively towards alignment which is reached after each group of 16 such elementary distances. Thus, if the corrector 435, 441, 436 is kept vertically static in relation to the rack teeth, it would only be able to be put into correct mesh when the read arms are set to tracks 16, 32, . . . .

If, however, the binary sequence 1, 2, 4, 8, 16 . . . is considered, it will be seen that if one considers the aggregator being set in turn to select each track in the first (or any other) group of 16 tracks, the fourth rack of the aggregator in FIG. 19 is moved to every one of the first 15 positions, and then homed to the sixteenth position. Thus, if the corrector head is moved parallel to and in the same direction as sector 432 by the fourth aggregator rack, its teeth will always be aligned with the corrector teeth 434 on sector 432. This operation is performed as follows.

Assuming that the rack marked 380 in FIG. 19 is the fourth rack, it carries a stop 442 engaging the lower end of two-armed lever 443, FIG. 22, pivoted on shaft 444 and carrying at the end of its horizontal arm, a stop 445 resting against the top of a finger 446 on a lever arm 447 freely journalled on the read arm shaft 421. The stop 445 rests against the top of a finger 446 and so, through lever 443, takes up any backlash in the first 4 stages of the aggregator and ensures accurate positioning of the corrector teeth 435.

Movement of the aggregator from the zero position, corresponding to the read arm position nearest the disc axis, results in anticlockwise or downward movement of sector 432. The same movement of the first 4 stages of the aggregator result in clockwise movement of lever 443, FIG. 22, and downward movement of lever arm 447, and corrector arm 437, so that the teeth 435 and 434 remain in alignment for 15/16 of the tooth pitch. When the 5th aggregator rack, FIG. 19, is moved to record 16, the first four racks are homed and as the stop 442, FIG. 19, moves upwards (to the right, FIG. 22), the spring 448, FIG. 23, forces the lever 447 and with it stop 445 on lever 443, FIG. 22, upwards so that the lower end of lever 443 follows up stop 442 and takes up any backlash in the first 4 stages of the aggregator, and the corrector arm 437 moves up to its home position. The corrector teeth 435 are again in alignment with the rack teeth 434 but displaced by one corrector tooth from the original alignment. This follow-up process continues tooth by tooth, the two sets of teeth being always at or near 1/16 pitch alignment. Thus, when the new setting is reached, and the cam, 439, FIG. 23, allows spring 438 to force the corrector arm 437 towards rack 432, teeth 435 enter teeth 434 substantially in alignment and force such slight angular movement of rack 432 necessary to correct any inaccuracy of alignment of teeth 434 and rack 432. By this means, precise alignment of the read heads on any selected track is obtained.

The lubricating oil pressure is used to urge the lever 418 against the pull of a spring 452, towards a backstop 449 by means of a plunger 450 on a piston within an oil cylinder 451 carried by the framework. The aggregator moves the lever 418 against the resultant force of the plunger 450 and spring 452. When the machine is idle and the oil pressure is released, spring 452 takes command to urge lever 418 beyond its normal throw, the aggregator being designed to allow of this movement. At the same time, a similar oil plunger, not shown, backing up spring 438 would be released and allow a light spring, not shown, to withdraw the corrector cam lever 440 and withdraw the corrector from the sector 432. The lever 418 is then moved into contact with cylinder 451 or a suitable stop, and in doing so turns the read arm shaft sufficiently to withdraw the read arms 422 free of the magnetic discs 423, FIG. 23. This allows the discs to be removed and replaced on their shaft 425. The discs 423 are built in multiple units of 3 or more, suitable for storage, as previously described.

It is desirable to indicate the position of the read arms: that is, the number of the track on which they stand. Such indication can be conveniently obtained from the shaft 419 of the aggregator follower lever 418, and from the shaft 444 of the aggregate fourth stage follower lever 443, which respectively give the total aggregator movement, and the movement of the first 4 stages only.

Referring now to FIGS. 24, 25, the shafts 419, 444 will be extended through a support 469 together with a third shaft 461. Sector plates 454, 462 are fixed respectively to shafts 419, 461 and are each formed with annular peripheral extension plates 455, 463, each pierced with lateral rows of 4-element binary-code holes, there being 16 rows in each extension plate identifying the decimal numbers 1–16 in binary code. It is desired to indicate the binary bits $2^4$–$2^7$ by means of plate 455, but the angular position of shaft 419 indicates the complete 8-digit binary code. It is therefore necessary to adjust the code setting of 455 with respect to its reading equipment in any one of 16 equally spaced positions out of 256 positions into which 455 can be set on its shaft. This is done by moving the reading equipment for code plate 455 as described below. The shaft 444 carries a two-armed lever, the right hand end of which carries a worm rack 461 meshing with a wormwheel on the shaft carrying the sector 462, 463.

The code plates 455, 465 are read photo-electrically by lateral arrays of lamps 456, 465 on one side of the code plates, and corresponding lateral arrays of photo-electric cells 457, 466 on the other side of each code plate, there being 4 lamps or cells in each array. The lamps and cells for code plate 463 are on a fixed mounting 464.

The lamps and cells for code plate 455 are mounted on supports carried by a lever arm 453 freely pivoted on shaft 419 and connected by a link 458 to the left-hand arm of lever 459.

In consequence, the movement of shaft 444 in response to the movement of the 4th aggregator rack in FIG. 19, is transferred by linkage 459, 458, 453 to the reading equipment for code plate 455 and moves the reading equipment so as, in effect, to exclude from the relative positions of the plate 455 and its reading equipment, all positions other than the 16 punched code positions thereon, so that the reading equipment effectively steps from any one such position to another without stopping in any intermediate position.

In the result, code plate 463 sets its photoelectric cells to a 4-element code representing the 4 lowest binary digit positions, while code plate 455 sets its photo-electric cells to a 4-element code representing the upper 4 binary digit positions, so that together the two sets of 4 cells signal a complete 8-digit binary number identifying which of 256 disc tracks is in use.

It may be possible to have fixed equipment for code plate 455 by having lateral arrays of slots, each covering 16 of the 256 positions to which plate 455 can be set. It would be necessary to have the lamps and cells securely screened.

What I claim is:

1. A magnetic disc file which comprises:

a parallel stack of spaced discs on a common drive shaft;

a parallel line of processing head arms which are on a spindle parallel to said common shaft and which are so positioned that said arms are interleaved with said discs;

and a mechanical multi-stage movement aggregator for turning said spindle in response to a multi-element signal code, so as to locate said processing heads at any desired one of a number of radially-spaced circular recording tracks on said discs;

wherein said aggregator comprises a multi-stage concertina linkage formed by a series of base-less triangular linkages which are pivoted to each other in series by pivots which are freely movable along parallel lines along which they are constrained to move, and means for individually moving the apex of each triangular linkage to any one of a plurality of spaced lines parallel to said pivot lines, the spacing being normal to said pivot lines.

2. A magnetic disc file as claimed in claim 1 wherein said means for individually adjusting the linkages are arranged to perform invariable periods of movement within which variable controls are exercised, and wherein said means are normally statically positioned in readiness to initiate a period without delay.

3. A magnetic disc file as claimed in claim 1 wherein said means for individually adjusting the linkages are arranged to perform an invariable cycle of movement within which variable controls are exercised, wherein said means are normally continuously and idly repeating said cycle and which comprises means for operatively activating said linkage-adjusting means at the beginning of a cycle.

4. A magnetic disc file which comprises:
- a parallel stack of spaced discs on a common drive shaft;
- a parallel line of processing head arms which are on a spindle parallel to said common shaft and which are so positioned that said arms are interleaved with said discs;
- a mechanical multi-stage movement aggregator for turning said spindle in response to a multi-element signal code, so as to locate said processing heads at any desired one of a number of radially-spaced circular recording tracks on said discs;
- and a mechanical reversible servo-amplifier acting as a servo-link between said aggregator and said means for turning said processing-arm spindle, said servo-amplifier comprising
  - friction plates carried by facing surfaces of driving rotors;
  - a driven rotor between, coaxial with, and closely spaced from, said driving rotors;
  - said driven rotor being internally bored and so mounted on a spindle constituting the input of the amplifier so that relative rotation of said driven rotor and said spindle will cause movement of said driven rotor longitudinally of said spindle towards one or other of said driving rotors which thereby provide the source of power for driving the driven rotor in one direction or the other.

5. A magnetic disc file as claimed in claim 4 wherein each aggregator stage is controlled by a cam assembly all the cams of which are formed to give continuous acceleration followed by continuous deceleration, and interconnections between said aggregator and said amplifier for rotating said amplifier spindle, whereby during acceleration said driven rotor is assisted by the driving rotor which is rotating in the direction in which the spindle is rotating and during deceleration said driven rotor is moved over to the other driving rotor and is braked thereby.

6. A magnetic disc file as claimed in claim 4 comprising multi-plate clutches between said driven rotor and said driving rotors each comprising parallel sets of driving and plates of steel and sintered bronze respectively which are oil-lubricated.

7. A magnetic disc file which comprises:
- a parallel stack of spaced discs on a common drive shaft;
- a parallel line of processing head arms which are on a spindle parallel to said common shaft and which are so positioned that said arms are interleaved with said discs;
- and a mechanical multi-stage movement aggregator for turning said spindle in response to a multi-element signal code, so as to locate said processing heads at any desired one of a number of radially-spaced circular recording tracks on said discs;

wherein said aggregator comprises
- a sequential array of helical racks each successive pairs of which are in parallel spaced planes with their ends overlapping,
- a number of shafts one less in number than said racks and each carrying a pair of spaced helical gears, each said shaft being arranged at right angles to and across the overlapping ends of a pair of racks so that the two gears mesh with the two racks,
- wherein the helical rack at one end is fixed, all the other helical racks are mounted so as to be capable of sliding longitudinally in their parallel planes, and to be movable along its own axis,
- means for moving any desired combination of said shafts each along its own axis and in an arbitrarily selected direction,
- whereby the relative sequential positions of said racks can be set to any one of a large number of settings in each of which the outer end of the movable end racks is in a different longitudinal position.

8. A magnetic disc file which comprises:
- a parallel stack of spaced discs on a common drive shaft;
- a parallel line of processing head arms which are on a spindle parallel to said common shaft and which are so positioned that said arms are interleaved with said discs;
- a mechanical multi-stage movement aggregator for turning said spindle in response to a multi-element signal code, so as to locate said processing heads at any desired one of a number of radially-spaced circular recording tracks on said discs;
- said aggregator comprising a cam assembly per stage, each cam assembly comprising a pair of cams one for each of two opposite directions of movement.

9. A magnetic disc file as claimed in claim 8 comprising driving means for continuously rotating said cams and automatic control means for initiating an aggregator-setting cycle at a predetermined position of said cams.

10. A magnetic disc file as claimed in claim 8 comprising continuously-rotating driving means for said cams, clutch means for clutching said cams to said driving means, and positioning means for locating said cams in a predetermined static position at the end of each cycle of operations in readiness for a succeeding cycle of operations.

11. A magnetic disc file as described in claim 8, further comprising driving means for said cams, individual clutches for operatively connecting said cams individually to said driving means, and cam follower means permanently interconnecting each cam and a respective aggregator stage, wherein each cam has successive sectors of its periphery arranged to control movements of a respective aggregator stage between a plurality of different positions, and comprising control means for controlling the extent of movement of each cam during a cycle of operations to the angle contained by a single one of said sectors, whereby said cams control a plurality of different movements of an aggregator stage in turn.

12. A magnetic disc file which comprises:
- a parallel stack of spaced discs on a common drive shaft;
- a parallel line of processing head arms which are on a spindle parallel to said common shaft and which are so positioned that said arms are interleaved with said discs;
- a mechanical multi-stage movement aggregator for turning said spindle in response to a multi-element signal code, so as to locate said processing heads at any desired one of a number of radially-spaced circular recording tracks on said discs;

means for electrically recording a multi-element binary code;

means response to the position of the spindle for indicating the identity of the track on the discs on which said processing arms are standing in a direct-reading multi-digit binary number;

and means for comparing each recorded binary code bit with the indication of the spindle position for initiating a cycle of operations of said aggregator limited to those stages the existing setting of which differs from the setting dictated by the binary code.

13. A magnetic disc file as claimed in claim 12 wherein said electrical equipment comprises electrical control contacts mounted on the mechanical equipment so as to detect particular settings of said mechanical equipment and to exercise control of said electrical equipment in accordance therewith.

14. A magnetic disc file as claimed in claim 12 wherein said electrical equipment comprises a number of stages equal to the number of stages in said aggregator, and each directly controllable by a corresponding bit in a binary code having a number of bits also equal to the number of aggregator stages.

15. A magnetic disc file as claimed in claim 12 and comprising means for detecting identity between an existing aggregator setting and a required aggregator setting defined by a received binary code, and for automatically preventing the initiation of an aggregator cycle in response to receipt of a code for which such identity is detected.

16. A magnetic disc file which comprises:

a parallel stack of spaced discs on a common drive shaft;

a parallel line of processing head arms which are on a spindle parallel to said common shaft and which are so positioned that said arms are interleaved with said discs;

a mechanical multi-stage movement aggregator for turning said spindle in response to a multi-element signal code, so as to locate said processing heads at any desired one of a number of radially-spaced circular recording tracks on said discs;

magnetic heads adjustably mounted near the free ends of each processing arm for movement to and from adjacent disc surfaces;

and head adjusting means operable by longitudinal push-pull movements of a rod-like member parallel to and slidably mounted on each arm.

17. A magnetic disc file as claimed in claim 16 wherein said adjusting means is a laterally-expansible linkage between two oppositely-facing heads for processing the opposed faces of two adjacent discs.

References Cited

UNITED STATES PATENTS

| | | | |
|---|---|---|---|
| 2,690,913 | 10/1954 | Rabinow | 340—174.1 |
| 2,811,709 | 10/1957 | Haselton et al. | 340—174.1 |
| 3,007,144 | 10/1961 | Hagopian | 340—174.1 |
| 3,052,874 | 9/1962 | Krakinowski et al. | 340—174.1 |
| 3,130,393 | 4/1964 | Gutterman | 340—174.1 |
| 3,183,516 | 5/1965 | Sliter | 346—74 |

BERNARD KONICK, *Primary Examiner.*

V. P. CANNEY, *Assistant Examiner.*